(12) United States Patent
Hosokawa et al.

(10) Patent No.: US 10,540,895 B2
(45) Date of Patent: Jan. 21, 2020

(54) MANAGEMENT OF MOBILE OBJECTS

(71) Applicant: INTERNATIONAL BUSINESS MACHINES CORPORATION, Armonk, NY (US)

(72) Inventors: Kaoru Hosokawa, Tokyo (JP); Satoshi Hosokawa, Funabashi (JP); Yasutaka Nishimura, Yamato (JP); Makoto Tanibayashi, Tokyo (JP); Takahito Tashiro, Mitaka (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 15/628,762

(22) Filed: Jun. 21, 2017

(65) Prior Publication Data

US 2018/0374353 A1 Dec. 27, 2018

(51) Int. Cl.
*G08G 1/16* (2006.01)
*B60W 30/08* (2012.01)
(Continued)

(52) U.S. Cl.
CPC ............ *G08G 1/162* (2013.01); *B60W 30/08* (2013.01); *B60W 30/0953* (2013.01);
(Continued)

(58) Field of Classification Search
None
See application file for complete search history.

(56) References Cited

U.S. PATENT DOCUMENTS

| 4,350,970 A | 9/1982 | Von Tomkewitsch |
| 4,907,159 A | 3/1990 | Mauge |

(Continued)

FOREIGN PATENT DOCUMENTS

| CN | 102147260 A | 8/2011 |
| CN | 102231231 A | 11/2011 |

(Continued)

OTHER PUBLICATIONS

Abrougui et al., "Efficient load balancing and QoS-based location aware service discovery protocol for vehicular ad hoc networks," EURASIP Journal on Wireless Communications and Networking, Mar. 2012, p. 1-15, Springer.

(Continued)

*Primary Examiner* — Richard M Camby
(74) *Attorney, Agent, or Firm* — Erik K. Johnson

(57) ABSTRACT

An embodiment of the invention may include a method, computer program product and computer system for managing mobile objects. The embodiment may determine, by a mobile object server, a position of a mobile object in a geographic space managed by the mobile object server. The embodiment may determine a plurality of routes based on the position of the mobile object in the geographic space. The embodiment may calculate, by the mobile object server, a plurality of route parameters for the plurality of routes, wherein the plurality of route parameters includes a passage possibility of the mobile object over each route. The embodiment may calculate a plurality of edge parameters for a plurality of edges, wherein each edge is a segment of a route, and wherein the edge parameter includes the passage possibility of the mobile object over each edge.

19 Claims, 23 Drawing Sheets

(51) Int. Cl.
*B60W 30/095* (2012.01)
*G08G 1/0967* (2006.01)
*G08G 1/0968* (2006.01)
*G06F 16/29* (2019.01)
*G01C 21/34* (2006.01)
*G06F 16/48* (2019.01)

(52) U.S. Cl.
CPC ..... *B60W 30/0956* (2013.01); *G01C 21/3446* (2013.01); *G01C 21/3492* (2013.01); *G06F 16/29* (2019.01); *G08G 1/096741* (2013.01); *G08G 1/096811* (2013.01); *G06F 16/489* (2019.01)

(56) References Cited

U.S. PATENT DOCUMENTS

| | | |
|---|---|---|
| 5,164,904 A | 11/1992 | Sumner |
| 5,173,691 A | 12/1992 | Sumner |
| 5,247,439 A | 9/1993 | Gurmu |
| 5,289,183 A | 2/1994 | Hassett |
| 5,610,821 A | 3/1997 | Gazis |
| 6,028,550 A | 2/2000 | Froeberg |
| 6,138,163 A | 10/2000 | Nam et al. |
| 6,150,961 A | 11/2000 | Alewine |
| 6,317,058 B1 | 11/2001 | Lemelson et al. |
| 6,480,783 B1 | 11/2002 | Myr |
| 6,680,674 B1 | 1/2004 | Park |
| 6,906,709 B1 | 6/2005 | Larkin |
| 7,277,938 B2 | 10/2007 | Duimovich et al. |
| 7,395,151 B2 | 7/2008 | O'Neill |
| 7,447,588 B1 | 11/2008 | Xu |
| 7,466,244 B2 | 12/2008 | Kimchi |
| 7,564,377 B2 | 7/2009 | Kimchi |
| 7,689,348 B2 | 3/2010 | Boss |
| 7,710,421 B2 | 5/2010 | Muramatsu |
| 7,788,109 B2 | 8/2010 | Jakobson |
| 7,899,611 B2 | 3/2011 | Downs |
| 7,979,172 B2 | 7/2011 | Breed |
| 8,000,887 B2 | 8/2011 | Nathan |
| 8,103,445 B2 | 1/2012 | Smith |
| 8,396,652 B2 | 3/2013 | Nomura |
| 8,428,876 B2 | 4/2013 | Lee |
| 8,606,727 B2 | 12/2013 | Wu |
| 8,612,278 B1 | 12/2013 | Ashley, Jr. |
| 8,620,510 B1 | 12/2013 | Meuth |
| 8,626,704 B2 | 1/2014 | Sawai |
| 8,630,958 B2 | 1/2014 | Carlsson |
| 8,768,012 B2 | 7/2014 | Satoh |
| 8,793,046 B2 | 7/2014 | Lombrozo |
| 8,799,246 B2 | 8/2014 | Nomura |
| 8,818,608 B2 | 8/2014 | Cullinane |
| 8,824,997 B2 * | 9/2014 | Gehlen ............... G08G 1/0965 455/404.1 |
| 8,843,309 B2 | 9/2014 | Kimchi |
| 8,850,011 B2 | 9/2014 | Kimchi |
| 8,850,013 B2 | 9/2014 | Waldman |
| 8,862,146 B2 | 10/2014 | Shatsky |
| 8,903,431 B2 | 12/2014 | Koch |
| 8,903,593 B1 | 12/2014 | Addepalli et al. |
| 8,930,269 B2 | 1/2015 | He |
| 8,934,754 B2 | 1/2015 | Billau et al. |
| 8,938,443 B2 | 1/2015 | Etzion |
| 8,988,252 B2 | 3/2015 | Scholl |
| 8,989,053 B1 | 3/2015 | Skaaksrud et al. |
| 8,995,662 B2 | 3/2015 | Rubin et al. |
| 9,041,812 B2 | 5/2015 | Billau et al. |
| 9,058,703 B2 | 6/2015 | Ricci |
| 9,104,965 B2 | 8/2015 | Fritsch |
| 9,154,909 B2 | 10/2015 | Fulger et al. |
| 9,172,398 B2 | 10/2015 | Miyazaki |
| 9,280,567 B2 | 3/2016 | Fischer |
| 9,384,609 B2 | 7/2016 | Ricci |
| 9,424,521 B2 | 8/2016 | Bloomquist |
| 9,460,616 B1 | 10/2016 | Miyahira |
| 9,467,839 B1 | 10/2016 | Nishimura |
| 9,494,439 B1 | 11/2016 | Ross |
| 9,497,170 B2 | 11/2016 | Akiyama |
| 9,497,590 B1 | 11/2016 | Gotoh |
| 9,497,591 B1 | 11/2016 | Gotoh |
| 9,507,808 B2 | 11/2016 | Fischer |
| 9,513,134 B1 | 12/2016 | Ishikawa |
| 9,538,327 B1 | 1/2017 | Gotoh |
| 9,562,775 B2 | 2/2017 | Gotoh |
| 9,576,482 B2 | 2/2017 | Yamamoto |
| 9,578,093 B1 | 2/2017 | Gotoh |
| 9,584,977 B2 | 2/2017 | Yamamoto |
| 9,615,215 B2 | 4/2017 | Yuen et al. |
| 9,638,533 B2 | 5/2017 | Gotoh |
| 9,639,537 B2 | 5/2017 | Gotoh |
| 9,640,073 B2 | 5/2017 | Gueziec |
| 9,646,402 B2 | 5/2017 | Gotoh |
| 9,646,493 B2 | 5/2017 | Yamamoto |
| 9,659,016 B2 | 5/2017 | Gotoh |
| 9,668,103 B1 | 5/2017 | Edwards et al. |
| 9,674,812 B2 | 6/2017 | Skaaksrud et al. |
| 9,678,986 B2 | 6/2017 | Hancock et al. |
| 9,681,104 B2 | 6/2017 | Billau et al. |
| 9,868,394 B1 | 1/2018 | Fields et al. |
| 9,868,446 B1 | 1/2018 | Zhu et al. |
| 9,882,818 B2 | 1/2018 | Shao et al. |
| 2001/0029425 A1 | 10/2001 | Myr |
| 2002/0161833 A1 | 10/2002 | Niven |
| 2005/0027434 A1 | 2/2005 | Hirose |
| 2005/0065711 A1 | 3/2005 | Dahlgren |
| 2005/0195821 A1 | 9/2005 | Yun et al. |
| 2005/0222933 A1 | 10/2005 | Wesby |
| 2006/0158330 A1 | 7/2006 | Gueziec |
| 2007/0067373 A1 | 3/2007 | Higgins |
| 2007/0109303 A1 | 5/2007 | Muramatsu |
| 2007/0208492 A1 | 9/2007 | Downs |
| 2007/0208496 A1 | 9/2007 | Downs et al. |
| 2007/0225912 A1 | 9/2007 | Grush |
| 2007/0241932 A1 | 10/2007 | Otero |
| 2008/0046134 A1 | 2/2008 | Bruce |
| 2008/0088480 A1 | 4/2008 | Rozum |
| 2008/0114530 A1 | 5/2008 | Petrisor |
| 2008/0248815 A1 | 10/2008 | Busch |
| 2008/0255754 A1 | 10/2008 | Pinto |
| 2009/0070024 A1 | 3/2009 | Burchard |
| 2009/0167597 A1 | 7/2009 | Strachan |
| 2009/0210477 A1 | 8/2009 | White |
| 2009/0248758 A1 | 10/2009 | Sawai |
| 2009/0254971 A1 | 10/2009 | Herz et al. |
| 2009/0282125 A1 | 11/2009 | Jeide |
| 2009/0287405 A1 | 11/2009 | Liu |
| 2009/0327918 A1 | 12/2009 | Aaron |
| 2010/0011031 A1 | 1/2010 | Huang et al. |
| 2010/0036578 A1 | 2/2010 | Taguchi |
| 2010/0036595 A1 | 2/2010 | Coy |
| 2010/0063715 A1 | 3/2010 | Wynter et al. |
| 2010/0069035 A1 | 3/2010 | Johnson |
| 2010/0087981 A1 | 4/2010 | Orozco-Perez |
| 2010/0100310 A1 | 4/2010 | Eich |
| 2010/0188265 A1 | 7/2010 | Hill |
| 2010/0199213 A1 | 8/2010 | Suzuki |
| 2011/0037619 A1 | 2/2011 | Ginsberg |
| 2011/0047230 A1 | 2/2011 | McGee |
| 2011/0137557 A1 | 6/2011 | De Los Reyes |
| 2011/0191011 A1 | 8/2011 | McBride |
| 2011/0205040 A1 | 8/2011 | Van Wiemeersch |
| 2011/0208419 A1 | 8/2011 | Boss et al. |
| 2011/0285591 A1 | 11/2011 | Wong |
| 2011/0301770 A1 | 12/2011 | Rutman |
| 2012/0035839 A1 | 2/2012 | Stehle et al. |
| 2012/0041675 A1 | 2/2012 | Juliver |
| 2012/0065871 A1 | 3/2012 | Deshpande et al. |
| 2012/0089326 A1 | 4/2012 | Bouve |
| 2012/0092187 A1 | 4/2012 | Scholl |
| 2012/0136561 A1 | 5/2012 | Barker |
| 2012/0291049 A1 | 11/2012 | Park |
| 2012/0303222 A1 | 11/2012 | Cooprider |
| 2012/0323438 A1 | 12/2012 | Wendel |
| 2013/0002477 A1 | 1/2013 | Dehnie |

(56) References Cited

U.S. PATENT DOCUMENTS

| | | |
|---|---|---|
| 2013/0006531 A1 | 1/2013 | Gee |
| 2013/0006925 A1 | 1/2013 | Sawai |
| 2013/0013203 A1 | 1/2013 | Sumizawa |
| 2013/0030699 A1 | 1/2013 | Barnes |
| 2013/0059558 A1* | 3/2013 | Gehlen ............... G08G 1/0965 455/404.1 |
| 2013/0079964 A1 | 3/2013 | Sukkarie |
| 2013/0104231 A1 | 4/2013 | Niner |
| 2013/0141247 A1 | 6/2013 | Ricci |
| 2013/0179382 A1 | 7/2013 | Fritsch |
| 2013/0204524 A1 | 8/2013 | Fryer |
| 2013/0214939 A1 | 8/2013 | Washlow |
| 2013/0219039 A1 | 8/2013 | Ricci |
| 2013/0305357 A1 | 11/2013 | Ayyagari |
| 2013/0321397 A1 | 12/2013 | Chen |
| 2014/0032015 A1 | 1/2014 | Chun et al. |
| 2014/0075004 A1 | 3/2014 | Van Dusen et al. |
| 2014/0089243 A1 | 3/2014 | Oppenheimer |
| 2014/0089375 A1 | 3/2014 | Poornachandran |
| 2014/0104077 A1 | 4/2014 | Engel et al. |
| 2014/0120953 A1 | 5/2014 | Ingram |
| 2014/0136099 A1 | 5/2014 | Choi |
| 2014/0191858 A1 | 7/2014 | Morgan |
| 2014/0195214 A1 | 7/2014 | Kozloski |
| 2014/0236414 A1 | 8/2014 | Droz |
| 2014/0248899 A1 | 9/2014 | Emadzadeh |
| 2014/0277918 A1 | 9/2014 | Kim |
| 2014/0278026 A1 | 9/2014 | Taylor |
| 2014/0278029 A1 | 9/2014 | Tonguz |
| 2014/0278074 A1 | 9/2014 | Annapureddy et al. |
| 2014/0289267 A1 | 9/2014 | Felix |
| 2014/0306834 A1 | 10/2014 | Ricci |
| 2014/0365644 A1 | 12/2014 | Tanaka |
| 2015/0032418 A1 | 1/2015 | Akiyama |
| 2015/0051822 A1 | 2/2015 | Joglekar |
| 2015/0066284 A1 | 3/2015 | Yopp |
| 2015/0088835 A1 | 3/2015 | Davis |
| 2015/0112570 A1 | 4/2015 | Schmüdderich |
| 2015/0120083 A1 | 4/2015 | Gurovich |
| 2015/0127388 A1 | 5/2015 | Oldham |
| 2015/0149019 A1 | 5/2015 | Pilutti |
| 2015/0160023 A1 | 6/2015 | Goel et al. |
| 2015/0179077 A1 | 6/2015 | Morgan |
| 2015/0226858 A1 | 8/2015 | Leibner |
| 2015/0227553 A1 | 8/2015 | Dobre |
| 2015/0266455 A1 | 9/2015 | Wilson |
| 2015/0279122 A1 | 10/2015 | Lorenzen |
| 2015/0279182 A1 | 10/2015 | Kanaujia |
| 2015/0333992 A1 | 11/2015 | Vasseur |
| 2015/0349917 A1 | 12/2015 | Skaaksrud |
| 2015/0360692 A1 | 12/2015 | Ferguson |
| 2015/0371352 A1 | 12/2015 | Boss et al. |
| 2015/0375752 A1 | 12/2015 | Carlsson |
| 2016/0028632 A1 | 1/2016 | Vasseur |
| 2016/0042239 A1 | 2/2016 | Fowe |
| 2016/0061625 A1 | 3/2016 | Wang |
| 2016/0069695 A1 | 3/2016 | Broadbent |
| 2016/0076905 A1 | 3/2016 | Broadbent |
| 2016/0078756 A1 | 3/2016 | Basalamah |
| 2016/0092317 A1 | 3/2016 | Akiyama |
| 2016/0097649 A1 | 4/2016 | Broadbent |
| 2016/0112201 A1 | 4/2016 | Misawa et al. |
| 2016/0119419 A1 | 4/2016 | Choi |
| 2016/0133130 A1 | 5/2016 | Grimm et al. |
| 2016/0138930 A1 | 5/2016 | Akiyama |
| 2016/0189044 A1 | 6/2016 | Pan et al. |
| 2016/0203651 A1 | 7/2016 | Heath et al. |
| 2016/0212229 A1 | 7/2016 | McGavran |
| 2016/0212601 A1 | 7/2016 | Braun et al. |
| 2016/0245660 A1 | 8/2016 | Winckler |
| 2016/0351053 A1 | 12/2016 | Jung et al. |
| 2016/0358479 A1 | 12/2016 | Riedelsheimer |
| 2016/0370185 A1 | 12/2016 | Gotoh |
| 2016/0370190 A1 | 12/2016 | Gotoh |
| 2016/0370195 A1 | 12/2016 | Gotoh |
| 2016/0370469 A1 | 12/2016 | Mabuchi |
| 2016/0371120 A1 | 12/2016 | Gotoh |
| 2016/0371281 A1 | 12/2016 | Gotoh |
| 2016/0371299 A1 | 12/2016 | Gotoh |
| 2016/0371323 A1 | 12/2016 | Gotoh |
| 2016/0371326 A1 | 12/2016 | Gotoh |
| 2016/0371864 A1 | 12/2016 | Gotoh et al. |
| 2016/0371975 A1 | 12/2016 | Yamamoto |
| 2016/0373449 A1 | 12/2016 | Haga et al. |
| 2017/0010111 A1 | 1/2017 | Gotoh |
| 2017/0010112 A1 | 1/2017 | Gotoh |
| 2017/0012812 A1 | 1/2017 | Gotoh |
| 2017/0026858 A1 | 1/2017 | McKee |
| 2017/0067764 A1 | 3/2017 | Skupin et al. |
| 2017/0084175 A1 | 3/2017 | Sedlik |
| 2017/0178505 A1 | 6/2017 | Ishikawa et al. |
| 2017/0228410 A1 | 8/2017 | Slusar |
| 2017/0278409 A1 | 9/2017 | Johnson et al. |
| 2017/0352200 A1 | 12/2017 | Wang et al. |
| 2018/0022328 A1 | 1/2018 | Tochigi et al. |
| 2018/0053404 A1 | 2/2018 | Horita et al. |
| 2018/0189913 A1 | 7/2018 | Knopp et al. |

FOREIGN PATENT DOCUMENTS

| | | |
|---|---|---|
| CN | 102798854 A | 11/2012 |
| CN | 102997928 A | 3/2013 |
| CN | 103247176 A | 8/2013 |
| CN | 103258043 A | 8/2013 |
| CN | 103854072 A | 6/2014 |
| CN | 103971529 A | 8/2014 |
| CN | 104880722 A | 9/2015 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2003004468 A | 1/2003 |
| JP | 2007286706 A | 11/2007 |
| JP | 2008003829 A | 1/2008 |
| JP | 2008123325 A | 5/2008 |
| JP | 2008262418 A | 10/2008 |
| JP | 2008294921 A | 12/2008 |
| JP | 2009277078 A | 11/2009 |
| JP | 4985119 B2 | 7/2012 |
| JP | 2012155286 A | 8/2012 |
| JP | 2012207919 A | 10/2012 |
| JP | 2012233800 A | 11/2012 |
| JP | 2013045242 A | 3/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015051057 A | 4/2015 |
| KR | 101354607 B1 | 1/2014 |
| WO | WO-2007140527 A1 | 12/2007 |
| WO | 2011081157 A1 | 7/2011 |
| WO | WO-2013167085 A2 | 11/2013 |
| WO | WO-2016203385 A1 | 12/2016 |

OTHER PUBLICATIONS

Aulinas et al., "Local map update for large scale SLAM," Electronics Letters, Apr. 15, 2010, p. 1-2, vol. 46, No. 8.

Carson et al., "GPS Spoofing Detection and Mitigation Using Cooperative Adaptive Cruise Control System," IEEE Intelligent Vehicles Symposium (IV), Jun. 19-22, 2016, p. 1091-1096, Gothenburg, Sweden.

Dangel et al., "Can Road Traffic Volume Information Improve Partitioning for Distributed SUMO?," Modeling Mobility with Open Data, Lecture Notes in Mobility, 2015, p. 61-74, Springer International Publishing.

DRM, "Local Dynamic Map," DRM Research Seminar, Jun. 30, 2010, p. 1-72, Japan Digital Road Map Association.

Furuichi et al., "Information Sharing Among Mobile Apparatus," Application and Drawings, filed Jan. 24, 2017, 53 Pages, U.S. Appl. No. 15/413,560.

(56) References Cited

OTHER PUBLICATIONS

Gotoh et al., "Geographic Space Management," Application and Drawings, filed Mar. 2, 2017, 93 Pages, U.S. Appl. No. 15/447,594.
Gotoh et al., "Management of Mobile Objects," Application and Drawings, filed Dec. 16, 2015, 65 Pages, U.S. Appl. No. 14/970,631.
He et al., "Sharing Trajectories of Autonomous Driving Vehicles to Achieve Time-Efficient Path Navigation," IEEE Vehicular Networking Conference, 2013, p. 119-126.
Hong et al., "A grid-based node split algorithm for managing current location data of moving objects," The Journal of Supercomputing, Dec. 2007, p. 321-337, vol. 42, Issue 3, Springer.
Hsu et al., "Automatic Traffic Monitoring Method Based on Cellular Model," Fifth International Conference on Intelligent Information Hiding and Multimedia Signal Processing, 2009, p. 640-643, IEEE Computer Society.
IEEE, "Server—Definition," IEEE 100: The Authoritative Dictionary of IEEE Standards Terms, 2000, p. 1031, Seventh Edition.
IEEE, "System—Definition," IEEE 100: The Authoritative Dictionary of IEEE Standards Terms, 2000, p. 1143-1144, Seventh Edition.
Ihm et al., "Advanced Spatial Data Management for Enterprise Applications," An Oracle White Paper, Aug. 2010, p. 1-16, Oracle Spatial 11g.
International Searching Authority, "Notification of Transmittal of the International Search Report and the Written Opinion of the International Searching Authority, or the Declaration," Patent Cooperation Treaty, 21. Sep. 2016, 11 Pages, International Application No. PCT/IB2016/053523.
Ishikawa et al., "Management of Mobile Objects and Resources," Application and Drawings, filed Mar. 1, 2017, 56 Pages, U.S. Appl. No. 15/446,359.
Ishikawa et al., "Management of Mobile Objects and Resources," Application and Drawings, filed Dec. 16, 2015, 52 Pages, U.S. Appl. No. 14/970,626.
Ishikawa et al., "Management of Mobile Objects," Application and Drawings, filed Dec. 16, 2015, 78 Pages, U.S. Appl. No. 14/970,643.
Kattan et al., "Time-Series Event-Based Prediction: An Unsupervised Learning Framework Based on Genetic Programming," Information Sciences, Aug. 17, 2014, p. 1-38.
Liao et al., "Anomaly Detection in GPS Data Based on Visual Analytics," IEEE Symposium on Visual Analytics Science and Technology, Oct. 24-29, 2010, p. 51-58, Salt Lake City, Utah, USA.
Merriam-Webster, "placeholder", Merriam-Webster Dictionary, 2017, 1 Page.
Microsoft, "select," Microsoft Computer Dictionary, 2002, p. 471, 2nd Edition.
Miyahira et al., "Management of Mobile Objects and Service Platform for Mobile Objects," Application and Drawings, filed Jul. 14, 2016, 68 pages, U.S. Appl. No. 15/210,178.
Miyahira et al., "Management of Mobile Objects and Service Platform for Mobile Objects," Application and Drawings, filed Jul. 14, 2016, 68 pages, U.S. Appl. No. 15/210,207.
Narayanan et al., "Using Data Analytics to Detect Anomalous States in Vehicles," arXiv AI: Artificial Intelligence, Dec. 25, 2015, p. 1-10, arXiv:1512.08048 [cs.AI], Cornell University Library.
Nishimura et al., "Management of Dynamic Events and Moving Objects," Application and Drawings, filed Sep. 1, 2016, 91 Pages, U.S. Appl. No. 15/254,183.
Openstreetmap, "QuadTiles," OpenStreetMap Wiki, Last Modified on Mar. 3, 2014, p. 1-10, http://wiki.openstreetmap.org/wiki/QuadTiles, Accessed on Jun. 15, 2015.
Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.
Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.
Radin, "Gps Spoofing Detection Using Multiple Antennas and Individual Space Vehicle Pseudoranges," Open Access Master's Theses, 2015, p. 1-99, Paper 528, DigitalCommons@URI, University of Rhode Island.
Schade, "Sharing Data by Means of a Local Dynamic Map," Understanding the Standards for Cooperative ITS, Feb. 6, 2014, p. 1-10, MINES ParisTech, Transportation Sustainability Environment Consulting.
Sun et al., "Moving Object Map Analytics: A Framework Enabling Contextual Spatial-Temporal Analytics of Internet of Things Applications," IEEE International Conference on Service Operations and Logistics, and Informatics (SOLI), 2016, p. 101-106.
Suzumura et al., "X10-based Massive Parallel Large-Scale Traffic Flow Simulation," ProVISION, Winter 2012, p. 74-79, No. 72, IBM Professionals' Papers.
Y et al., "A Complex Event Processing System Approach to Real Time Road Traffic Event Detection," Journal of Convergence Information Technology (JCIT), Oct. 2013, p. 142-148, vol. 8, No. 15.
Yamamoto, "Management of Moving Objects," Application and Drawings, filed Apr. 10, 2017, 59 pages, U.S. Appl. No. 15/483,415.
Yang et al., "Detecting Road Traffic Events by Coupling Multiple Timeseries With a Nonparametric Bayesian Method," IEEE Transactions on Intelligent Transportation Systems, Oct. 2014, p. 1936-1946, vol. 15, No. 5.
Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.
Yim et al., "Investigation of Vehicles as Probes Using Global Positioning System and Cellular Phone Tracking: Field Operational Test," California Path Working Paper, Feb. 2001, p. 1-50, California Path Program Institute of Transportation Studies, University of California, Berkeley, CA.
Yumak et al., "Modelling Multi-Party Interactions among Virtual Characters, Robots, and Humans", Presence: Teleoperators & Virtual Environments, Spring 2014, p. 172-190, vol. 23, No. 2.
Dictionary.com, "pertain", 2018, p. 1.
Microsoft Computer Dictionary, 5th Edition, 2002, p. 228, "function".
IBM, "List of IBM Patents or Patent Applications Treated as Related (Appendix P)," Jul. 14, 2017, p. 1-2.
U.S. Appl. No. 15/628,787, entitled "Management of Mobile Objects", filed Jun. 21, 2017, 69 Pages.
U.S. Appl. No. 15/628,815, entitled "Management of Mobile Objects", filed Jun. 21, 2017, 74 Pages.
U.S. Appl. No. 15/629,089, entitled "Management of Mobile Objects", filed Jun. 21, 2017, 72 Pages.
U.S. Appl. No. 15/628,828, entitled "Management of Mobile Objects", filed Jun. 21, 2017, 71 Pages.
U.S. Appl. No. 15/628,797, entitled "Management of Mobile Objects", filed Jun. 21, 2017, 72 Pages.
U.S. Appl. No. 15/483,415, entitled "Management of Moving Objects", filed Apr. 10, 2017, 59 Pages.
International Searching Authority, "Notification of Transmittal of the International Search Report and the Written Opinion of the International Searching Authority, or the Declaration," Patent Cooperation Treaty, dated Oct. 17, 2018, 31 Pages, International Application No. PCT/IB2018/0054408.
International Searching Authority, "Notification of Transmittal of the International Search Report and the Written Opinion of the International Searching Authority, or the Declaration," Patent Cooperation Treaty, dated Oct. 17, 2018, 9 Pages, International Application No. PCT/IB2018/0054409.
Merriam-Webster Dictionary, "Candidate", 2017, p. 1.
Microsoft Computer Dictionary, "Object" 5th Edition, 2002, p. 372.
Pending U.S. Appl. No. 15/903,084, filed Feb. 23, 2018, entitled: "Management of Mobile Objects", pp. 1-69.
IBM: List of IBM Patents or Patent Applications Treated as Related (Appendix P), Mar. 2, 2018, pp. 1-2.
Pending U.S. Appl. No. 15/855,408, filed Dec. 27, 2017, entitled: "Management of Mobile Objects", pp. 1-68.

(56) References Cited

OTHER PUBLICATIONS

Pending U.S. Appl. No. 15/855,238, filed Dec. 27, 2017, entitled: "Management of Mobile Objects", pp. 1-71.
Pending U.S. Appl. No. 15/855,159, filed Dec. 27, 2017, entitled: "Management of Mobile Objects", pp. 1-69.

* cited by examiner

Event List

| Edge ID | Event ID | Location | Event Content | Influence Event |
|---|---|---|---|---|
| Edge 0001 | Eve 0214 | Full Length | Speed Limited to 30km/h | Eve 0114(Edge 0002) |
| Edge 0002 | Eve 0114 | 32m from the 1st node | Closure | Eve 0214(Edge 0001), Eve 0421(Edge 0003)... |
| ... | ... | ... | ... | ... |
| Edge 1000 | N/A | | | Eve 1201 (edge xxxx) |

FIG.9

| Edge ID | Counts | Location | Event Content |
|---|---|---|---|
| Edge 0009 | 2 | Full length | Congestion |
| Edge 0013 | 1 | 15m from the 2$^{nd}$ node | Skid |
| ..... | ..... | ..... | ..... |

Candidate Event List

*FIG. 10*

Notification Event List

| Edge ID   | Event ID | Location              | Event Content            |
|-----------|----------|-----------------------|--------------------------|
| Edge 0001 | Eve 0214 | Full Length           | Speed Limited to 30km/h  |
| Edge 0002 | Eve 0114 | 32m from the 1st node | Closure                  |

*FIG.11*

MANAGEMENT OF MOBILE OBJECTS

BACKGROUND

The present invention relates to management of the movement of mobile objects.

Driving support and automobile system receive information by communicating with a plurality of automobiles, acquires event information concerning accidents or obstructions on the road and maps this information onto a map along with the position of an automobile. Such systems reference automobile position information, automobile characteristic information, driver characteristic information, and the like, and transmits suitable event information to each automobile.

However, since the actual accidents, obstructions, traffic conditions, weather, and the like on the road change during the movement of the automobile, even if the event information acquired at one time is supplied to each automobile, there are cases where the actual conditions on the road differ from the event information. Accordingly, when a long time is needed to reach a destination from the current position, it is difficult to assist with the movement using only the currently acquired event information. Therefore, mechanisms may be necessary to consistently update event information during a trip, and additionally only supply relevant event information to assist.

Referring to U.S. Patent Publication No. 20130006531, a method for optimizing the provision of a predictive eHorizon in a driver assistance system. A method for providing a predictive eHorizon in a driver assistance system is provided, wherein a horizon provider in a driver assistance system makes information about an expected route course available to an assistance application. The horizon provider creates a planning table including information about the expected route course and/or including data to be provided as a function of the route course, associated with an expected position of the vehicle in the planning table. The planning table data to be provided by the assistance system application are taken at least partially from the planning table as a function of the current position of the vehicle.

Referring to U.S. Patent Publication No. 20120303222, a system and method of assisting a driver of a vehicle by providing driver and vehicle feedback control signals is disclosed. The system and method includes receiving location data of the vehicle from a GPS unit, receiving the location data of the vehicle and retrieving navigation characteristics relevant to the location data using a processing circuit, generating a most probable future path for the vehicle and determining a location of at least one navigation characteristic with respect to the most probable future path and the vehicle, generating vehicle data at least one vehicle sensor, and transmitting a control signal to a vehicle control area network to warn the driver of an upcoming navigation characteristic on the most probable path.

Referring to U.S. Patent Publication No. 20160212229, some embodiments of the invention provide a mobile device with a novel route prediction engine that (1) can formulate predictions about current or future destinations and/or routes to such destinations for the device's user, and (2) can relay information to the user about these predictions. In some embodiments, this engine includes a machine-learning engine that facilitates the formulation of predicted future destinations and/or future routes to destinations based on stored, user-specific data. The user-specific data is different in different embodiments. In some embodiments, the stored, user-specific data includes data about any combination of the following (1) previous destinations traveled to by the user, (2) previous routes taken by the user, (3) locations of calendared events in the user's calendar, (4) locations of events for which the user has electronic tickets, and (5) addresses parsed from recent e-mails and/or messages sent to the user. The device's prediction engine only relies on user-specific data stored on the device in some embodiments, relies only on user-specific data stored outside of the device by external devices/servers in other embodiments, and relies on user-specific data stored both by the device and by other devices/servers in other embodiments.

BRIEF SUMMARY

An embodiment of the invention may include a method, computer program product and computer system for managing mobile objects. The embodiment may determine, by a mobile object server, a position of a mobile object in a geographic space managed by the mobile object server. The embodiment may determine a plurality of routes based on the position of the mobile object in the geographic space. The embodiment may calculate, by the mobile object server, a plurality of route parameters for the plurality of routes, wherein the plurality of route parameters includes a passage possibility of the mobile object over each route. The embodiment may calculate a plurality of edge parameters for a plurality of edges, wherein each edge is a segment of a route, and wherein the edge parameter includes the passage possibility of the mobile object over each edge.

A further embodiment may calculate the plurality of edge parameters for the plurality of edges by calculating the edge parameter for each edge included in the plurality of routes, based on the route parameter of each route containing the edge.

A further embodiment may calculate the plurality of edge parameters for the plurality of edges by adding together the passage probability of each route containing the edge.

A further embodiment may additionally search for events located in the plurality of edges within the geographic space, and provide notification about the events to the mobile object.

The further embodiment may search for events located in the plurality of edges by prioritizing events of edges that have a higher edge parameter.

The further embodiment may search for events located in the plurality of edges by setting a search range for events located at a plurality of edges included in the plurality of routes, and searching for events of each edge included in the search range.

The further embodiment may search for events located in the plurality of edges further by setting the search range of the plurality of edges to span from a current position of the mobile object to an edge that is farther away on the route, for routes that have a higher route parameter.

The further embodiment may search for events located in the plurality of edges by determining there is an route with a route parameter that is higher than a reference parameter value among the plurality of routes, setting the search range at each edge to span from the current position of the mobile object to an estimated destination on the route.

The further embodiment may search for events located in the plurality of edges by setting the search range within a greater distance range from the edge, for edges that have a higher edge parameter.

The further embodiment may search for events located in the plurality of edges further by setting the search range within a shorter distance range from the edge, for edges that are closer to an estimated destination on the plurality of routes, among each of the edges included in the plurality of routes.

The further embodiment may search for events located in the plurality of edges by setting the search range within a greater distance range from the edge, for edges that are farther from a current position of the mobile object, among each of the edges included in the plurality of routes.

In a further embodiment the notification is based on the prioritized events.

In a further embodiment the notification includes setting a notification range of events at a plurality of edges included in the plurality of routes, and providing notification about the events of each edge included in the notification range.

In a further embodiment the notification includes setting the notification range at each edge to span from a current position of the mobile object to an edge that is farther away on the route, for routes that have a higher route parameter.

In a further embodiment the estimation includes estimating a most probable path (MPP), which is a route that is most likely to be traveled by the mobile object in the future, as the route.

In a further embodiment determining a plurality of routes includes sequentially updating the plurality of routes.

In a further embodiment determining a plurality of routes includes updating the route sets every time the mobile object moves to a new edge.

BRIEF DESCRIPTION OF THE DRAWINGS

FIG. 9 shows an illustrative example of an event list.

FIG. 10 shows an illustrative example of a candidate event list.

FIG. 11 shows an illustrative example of a notification event list.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
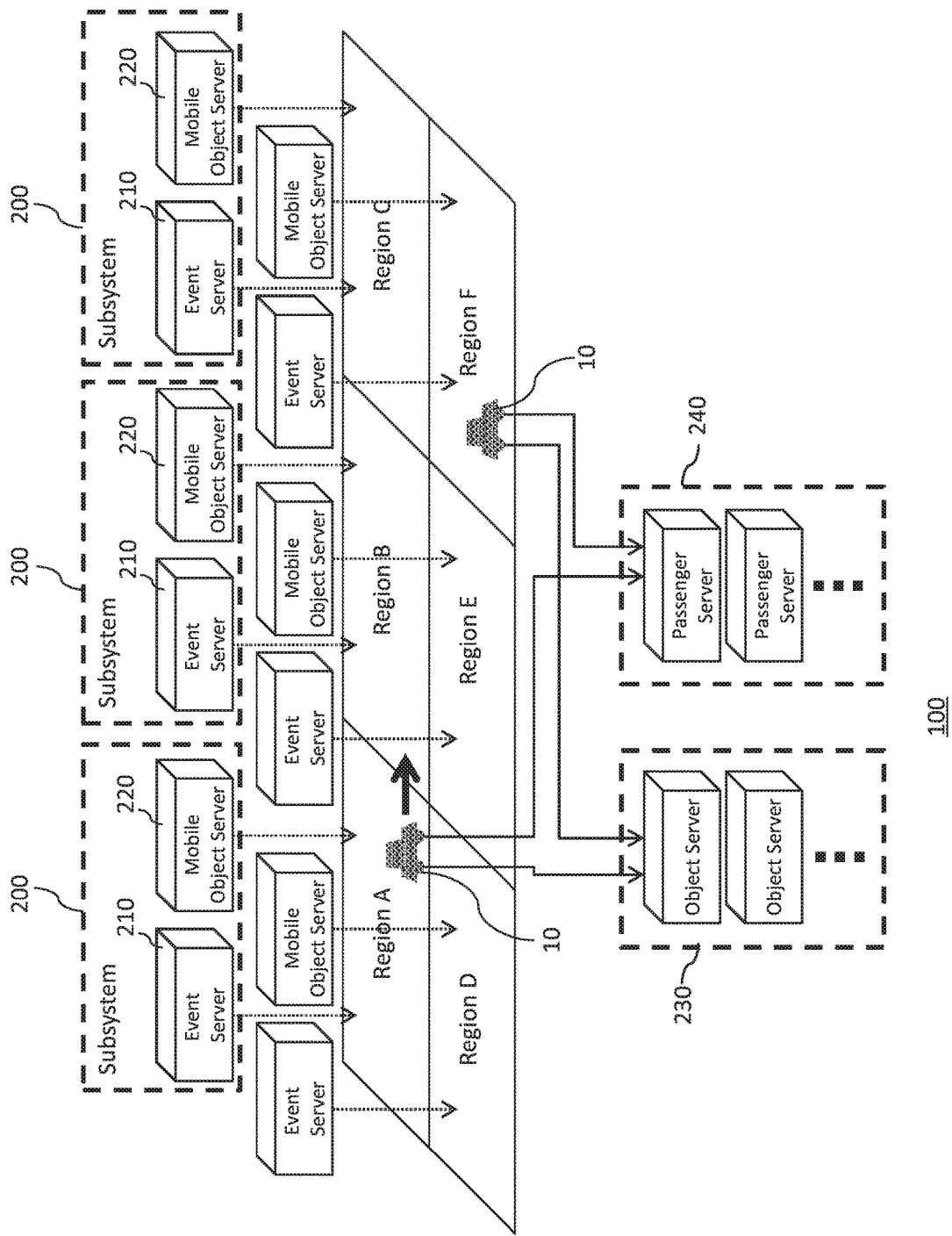
FIG. 1 shows a system 100 according to an embodiment of the present invention and a map area corresponding to a geographic space managed by the system 100.

FIG. 1 shows a system 100 and a map area corresponding to a geographic space managed by the system 100, according to an embodiment of the present invention. The system 100 manages a geographic space that includes routes on which a mobile object 10 moves. The system 100 is operable to divide the geographic space into a plurality of regions and manage these regions. A mobile object 10 may move on routes including land routes, sea routes, and/or air routes, for example. The geographic space may be land, sea, or air space that includes the routes on which the mobile object travels. The mobile objects 10 may be manned/unmanned automobiles, motorbikes, bicycles, humans having a digital device, airplanes, vessels, drones, or the like.

FIG. 1 shows an automobile as an example of the mobile object 10, which moves along roads as examples of land routes. The system 100 includes a plurality of subsystems 200 that respectively manage the plurality of regions. FIG. 1 shows an example in which the map area is divided into six regions from region A to region F, and six subsystems 200 respectively manage these six regions.

System 100 comprises a plurality of event servers 210, a plurality of mobile object servers 220, a plurality of object servers 230, and a plurality of passenger servers 240. According to the embodiment of FIG. 1, each of the subsystems 200 may include at least one of the plurality of event servers 210 and one of the plurality of mobile object servers 220.

The event server 210 manages events occurring in each region of the geographic space. In one embodiment, the event server 210 of subsystem 200 assigned to region A may manage events in region A. The plurality of mobile object servers 220 respectively assigned to a plurality of regions in a geographic space manage the mobile objects 10 in each of the plurality of regions. In one embodiment, the mobile object server 220 assigned to region A may manages mobile objects 10 located in region A. The object server 230 manages information of the mobile objects 10 regardless of the location of the mobile objects 10. The passenger server 240 manages information of at least one passenger riding on the mobile objects 10.

Each of the subsystems 200 may be implemented on one or more servers. In one embodiment, each event server 210 and mobile object server 220 may be implemented on one server. In one embodiment, a set of an event server 210 and a mobile object server 220 in a subsystem 200 may be implemented by one server. Portions of the system 100 other than the subsystems 200 may also be implemented on one or more servers. In one embodiment, each object server 230 and passenger server 240 may be implemented on one server. In another embodiment, a set of object servers 230 and a set of passenger servers 240 may be each implemented by one server. In yet another embodiment, all of the object servers 230 and the passenger servers 240 may be implemented on one server. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a mobile object 10 from the mobile object 10, and the mobile object server 220 managing the region that includes the acquired position of the mobile object 10 may manage the movement of this mobile object 10. The system 100 acquires information of events that have occurred to the mobile object 10 and/or on the road outside, and the event server 210 managing the region including the position where such an event has occurred may manage the state of the event.

This event may include information about accidents, obstructions, closure, limitation, status, or construction on the road, or information about the weather, temperature, buildings, shops, or parking lots near the road. In response to a setting or a request from the mobile object 10, the subsystem 200 may provide notification about the event information to the mobile object 10 that made the request. For example, if the mobile object 10 is moving on a route in a geographical area corresponding to region A, then the mobile object sever 220 managing region A provides this mobile object 10 with the notification about the event relating to the route.

Since the map area is divided into a plurality of regions, despite the mobile object 10 simply moving on a route, the region corresponding to the position of the mobile object 10 might change. FIG. 1 shows an example in which the mobile object 10 is driving on a road such that the position of the mobile object 10 moves from region A to region B on the regions. In this case, according to the movement of the mobile object 10, the system 100 may transfer the information concerning the mobile object 10 from the mobile object server 220 managing region A to the mobile object server 220 managing region B, and may also transfer the management of the mobile object 10 to the mobile object server 220 managing region B.

Figure 2:
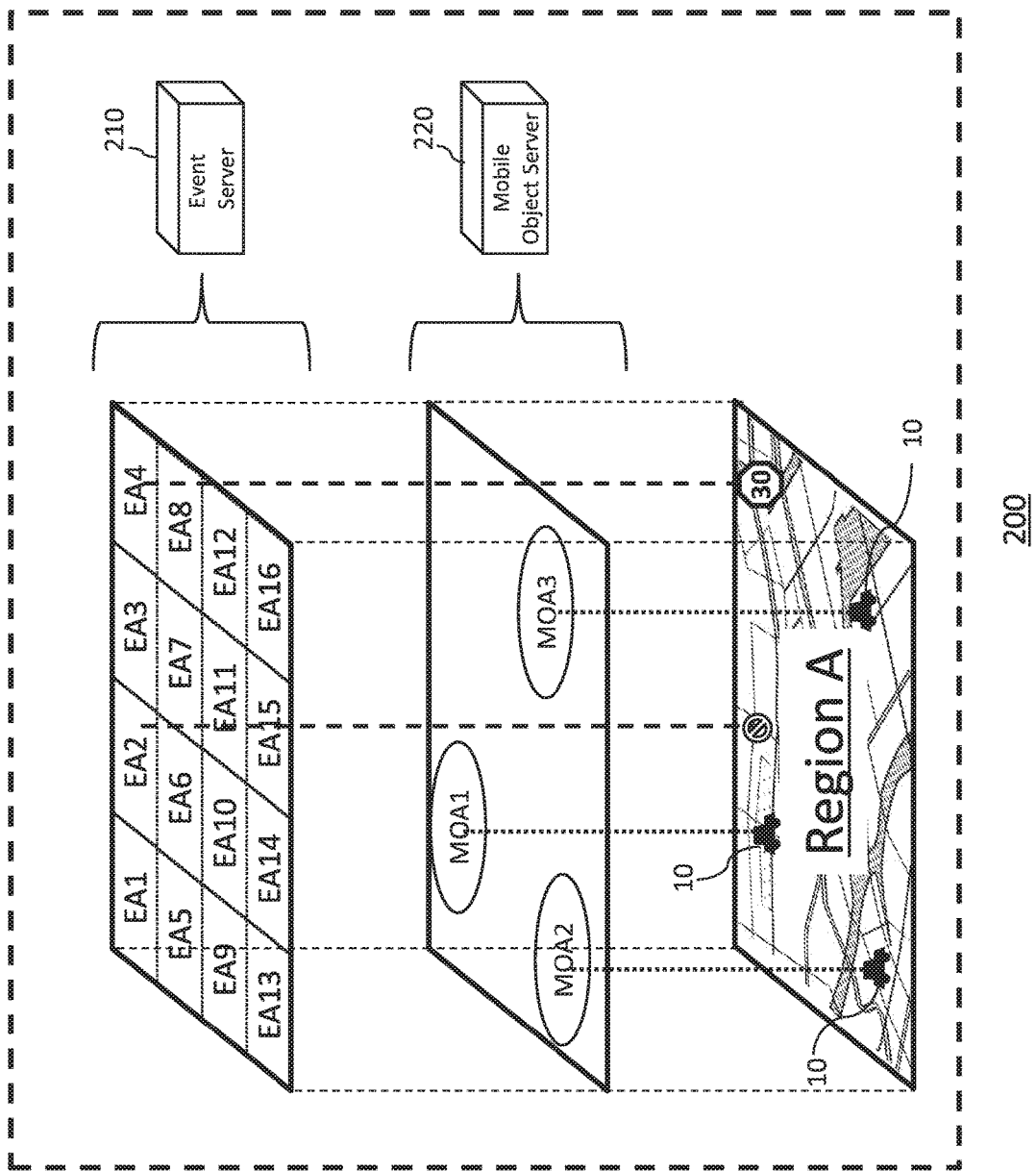
FIG. 2 shows a subsystem 200 according to the embodiment of the present invention and a map area corresponding to a region A managed by the subsystem 200.

FIG. 2 shows a subsystem 200 and a map area corresponding to a region A managed by the subsystem 200, according to an embodiment of the present invention. The event server 210 manages at least one event agent, and executes each event agent to manage events on routes in a region assigned to the event server 210. An "agent" may be a software entity having specific data, and may operable to receive a message (e.g. command), and return a result of the message. Each region of the plurality of regions of geographic space includes at least a portion of one area of the plurality of areas. In this embodiment, the region assigned to the event server 210 is the same as the region assigned to the mobile object server 220. However, in other embodiments, these regions may be different.

In the embodiment of FIG. 2, the region A, which is the region assigned to the event server 210, is divided into 16 areas and 16 areas are assigned to each of the event agents EA1-EA16. The event server 210 executes each of the event agents EA1-EA16 to manage events occurring on routes of each area of region A. For example, the event agent EA2 may manage a "closure" event on an area corresponding to EA2 on the map, and the event agent EA4 may manage a "speed limit" event on an area corresponding to EA4 as shown in FIG. 2.

The plurality of mobile object servers 220 may include at least one mobile object server 220 including one or more mobile object agents, each of which is assigned to each of the mobile objects 10. In the embodiment of FIG. 2, the mobile object server 220 includes three mobile object agents MOAs 1-3 assigned to three mobile objects 10 in the assigned region A. The mobile object server 220 executes each of the mobile object agents MOA1-MOA3 to manage the mobile objects 10 traveling on the region A.

Figure 3:
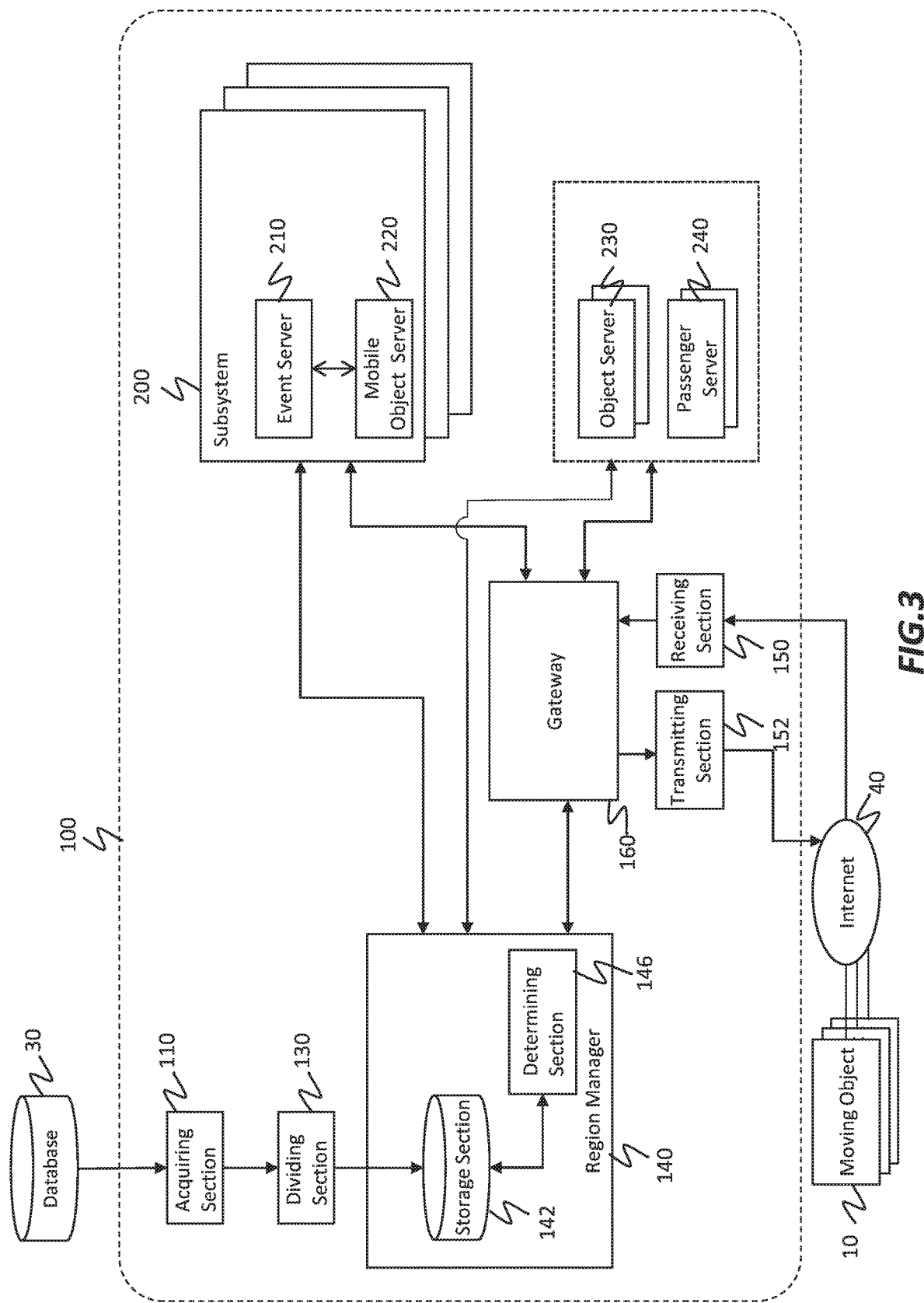
FIG. 3 shows a first exemplary configuration of the system 100 according to the present embodiment.

FIG. 3 shows an exemplary configuration of the system 100, according to an embodiment of the present invention. The system 100 may be operable to communicate with each of a plurality of mobile objects 10 to send and receive the information used to manage the mobile objects 10. The system 100 may be operable to acquire map data and/or information exchanged with the mobile objects 10, through the Internet, a subscriber network, a cellular network, or any desired combination of networks. The system 100 includes an acquiring section 110, a dividing section 130, a region manager 140, a receiving section 150, a transmitting section 152, a gateway apparatus 160, a plurality of subsystems 200, a plurality of object servers 230, and a plurality of passenger servers 240.

The acquiring section 110 may be operable to acquire map data corresponding to the geographical areas where a mobile object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire, accident information, traffic information, weather information, time information, etc.

The dividing section 130 may be operable to communicate with the acquiring section 110 and divide the map area into a plurality of regions. In this embodiment, the dividing section 130 generates two groups of regions by dividing an original map area into a plurality of regions.

The region manager 140 may be operable to store information concerning the plurality of regions including the regions resulting from the division. The region manager 140 may be operable to specify the subsystem 200 managing the region that includes the position of the mobile object 10, in response to receiving the position of the mobile object 10. The region manager 140 may be implemented on one or more servers.

The storage section 142 may be operable to communicate with the dividing section 130 and store information concerning the plurality of first regions and the plurality of second regions resulting from the division by the dividing section 130. The storage section 142 may store setting values or the like of the system 100.

The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The determining section 146 may be operable to communicate with the storage section 142, and determine one region from the plurality of regions (e.g., regions A-F of FIG. 1) in which each of the mobile objects 10 is located based on the position information of the mobile object 10 and geographic information of the plurality of regions. The determining section 146 may identify a route or position in the map area managed by the system 100 that corresponds to the position information of the mobile object 10.

The determining section 146 may store the position information of this mobile object 10 and/or information of the determined region in the storage section 142, in association with this mobile object 10. The determining section 146 may store a history of the position information of this mobile object 10 and/or a history of the determined mobile object server 220 in the storage section 142. The determining section 146 may be a circuit, a shared or dedicated computer readable medium storing computer readable program instructions executable by a shared or dedicated processor, etc.

The receiving section 150 may be operable to receive information transmitted from each of a plurality of mobile objects 10. Each mobile object 10 may transmit information at designated time intervals, and the receiving section 150 may sequentially receive this transmitted information. In this embodiment, the receiving section 150 may receive car probe data from each mobile object 10 as the information. The car probe data may include information detected by the mobile object 10, such as position information of the mobile object 10.

In one embodiment, the position information may include longitude and latitude (and optionally altitude information) of the mobile object 10 in an absolute coordinate system. In another embodiment, the mobile object 10 may determine its location in the absolute coordinate system by using GPS, and the determining section 146 receiving the position information may determine a route on which the mobile object 10 exists and a specific location of the route at which the mobile object 10 exists based on the position information. Alternatively, the mobile object 10 may include such detailed position information in the car probe data.

The receiving section 150 may communicate with the plurality of mobile objects 10 and receive the car probe data of each mobile object 10, via the Internet 40. The receiving section 150 may receive the car probe data of the plurality of mobile objects 10 through wireless communication, a subscriber network, a cellular network, or any desired combination of networks.

The transmitting section 152 may be operable to transmit event information to each of the mobile objects 10 according to settings, for example. The transmitting section 152 may transmit information concerning the route on which the mobile object 10 is expected to travel. The transmitting section 152 may communicate with the mobile objects 10 and transmit each type of information to the mobile objects 10 via the Internet 40. The transmitting section 152 may transmit each type of information to the mobile objects 10 through wireless communication, a subscriber network, a cellular network, or any desired combination of networks.

The gateway apparatus 160 may be operable to transfer communication between the plurality of subsystems 200 and the plurality of mobile objects 10. The gateway apparatus 160 may communicate with the receiving section 150 and receive the information transmitted by each mobile object 10.

The gateway apparatus 160 may communicate with the region manager 140 and demand the transfer destination for each piece of information received from the mobile objects 10, of the region manager 140. In response to this request, the gateway apparatus 160 may receive from the region manager 140 the information of the subsystem 200 managing the region on which the mobile object 10 exists. The gateway apparatus 160 may transfer the information received from the mobile object 10 to the subsystem 200 that is to manage the mobile object 10. In other words, the gateway apparatus 160 may transfer the information received from each mobile object 10 to the subsystem 200 determined by the region manager 140.

The gateway apparatus 160 may communicate with each of the subsystems 200, and receive the information transmitted by each subsystem 200. The gateway apparatus 160 may communicate with the transmitting section 152 and supply the transmitting section 152 with the information received from each subsystem 200, such that this information is transferred to the mobile objects 10 designated for each subsystem 200.

The gateway apparatus 160 may include a plurality of gateway devices, and may quickly perform transfer between the plurality of subsystems 200 and the plurality of mobile objects 10. In this case, the receiving section 150 may function as a load balancer that supplies the information from the mobile objects 10, such that the load is spread among the plurality of gateways. The load balancer may sequentially supply information from the mobile objects 10 to the gateways having lighter loads. The gateway apparatus 160 may be a network that provides a connection between a plurality of networks using the same or different types of protocols.

A plurality of subsystems 200 may be operable to communicate with the region manager 140 and the gateway apparatus 160 and to respectively manage a plurality of regions in a geographic space. Each subsystem 200 is operable to manage mobile objects 10 that travel routes in its managing region and to manage events on its managing region.

As described, each subsystem 200 may include the event server 210 and the mobile object server 220. The event server 210 manages events occurring on its managing region with the plurality of the event agents. In one embodiment, the event server 210 may perform, through the event agent, (i) registration, update and/or deletion of events, (ii) registration, update and/or deletion of candidate events, and (iii) provision of event information.

The mobile object server 220 manages the plurality of the mobile objects 10 traveling on its managing region with the plurality of the mobile object agents. In one embodiment, the mobile object server 220 may perform, through the mobile object agent, (i) processing of the car probe data, (ii) update of information of the mobile object, and (iii) provision of information to the mobile object. For example, the mobile object server 220 may execute the mobile object agent to collect information of events from at least one event server 210, and provide the mobile object 10 with information that assists the mobile object 10 with traveling in the geographic space. In another embodiment, the mobile object agent may control, or assist in controlling, the movement of the mobile object 10 traveling in the geographic space.

A plurality of object servers 230 including at least one object server 230 may communicate with the gate way 160 and include an object agent (OA) containing information of the mobile object 10. An object agent may correspond to each mobile object 10 and contain information thereof. In one embodiment, the object agent may contain (i) information, by region, of which subsystem currently manages a mobile object agent of the mobile object 10, (ii) an identification (ID) of the mobile object 10, (iii) an ID of a passenger of the mobile object 10, and (iv) a characteristic of the mobile object 10 (e.g., model/version information, width, length, and/or height of the mobile object 10).

The object server 230 may perform, through the object agent, (i) provision and/or update of information of the mobile object 10, (ii) registration, update, and/or deletion of the ID of passenger riding on the mobile object 10, (iii) provision and/or update of the information of the region of the mobile object 10, and (iv) provision of information needed for generation of a new mobile object agent by the mobile object server 220.

At least one passenger server 240 of a plurality of passenger servers may communicate with the gateway apparatus 160, and include a passenger agent that contains information of at least one passenger. A passenger agent may correspond to each passenger or candidate passenger of mobile objects 10, and contain information thereof. In one embodiment, the object agent may contain an ID of a passenger and a characteristic of the passenger (e.g., information of age, gender, type, and the like of license of the passenger). The passenger server 240 may perform, through the passenger agent, provision and/or update of information of the passengers.

As described above, the system 100 of the present embodiment may manage the mobile objects by utilizing the mobile object agents in each mobile object server 220, and manage the events by utilizing the event agent in each event server 210. According to the system 100 of the embodiment, the system 100 can separately manage information relating to the mobile objects 10 and events on the geographic map with a plurality of kinds of servers. Furthermore, the plurality of mobile object servers 220 can smoothly transfer the management of the mobile objects 10 traveling across the regions via the mobile object agents, thereby improving the efficiency of the whole system 100. In addition, according to the system 100 of the embodiment, each event server 210 divides event management in one region among the plurality of event agents and provides the mobile object agent with event information, thereby improving the efficiency of event management in the region (e.g., improving response time of event search) and thus event notification to the mobile objects 10. In addition, the system 100 can provide the mobile object agent with information of mobile object 10 by the object agent of the object server 230. The system 100 can also provide the mobile object agent with information of passengers of the mobile objects 10 by the passenger agent of the passenger server 240.

Figure 4:
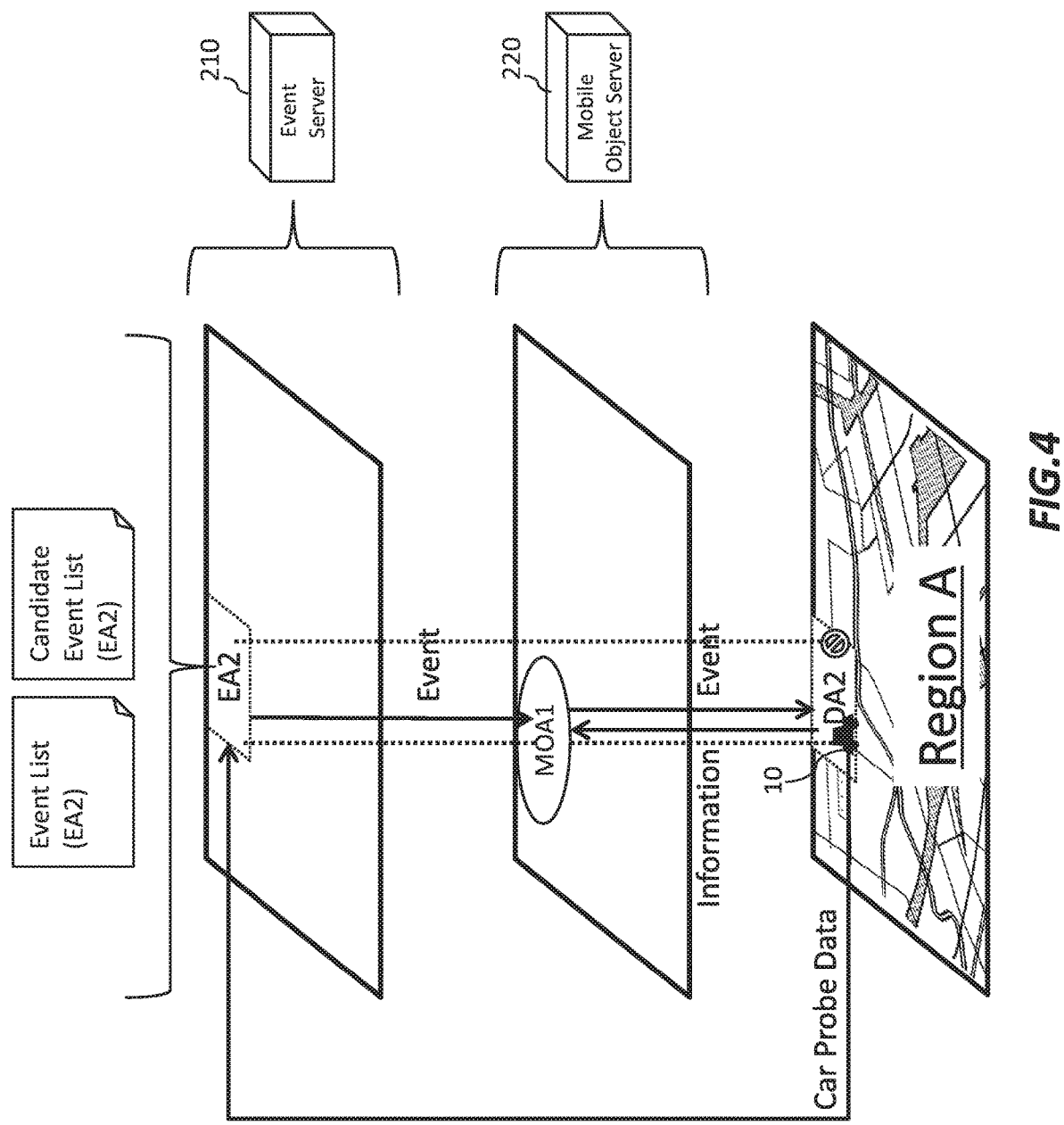
FIG. 4 shows management of events by the event server 210 and the mobile object server 220 according to one embodiment.

FIG. 4 shows management of events by the event server 210 and the mobile object server 220, according to an embodiment of the present invention. In this embodiment, a mobile object 10 is traveling on a target route on region A and transmitting a car probe data including the position information to the event server 210 managing region A with the car probe data via a gateway apparatus, such as the gateway apparatus 160. The event server 210 manages event information through each event agent based on the car probe data from the mobile objects on region A. For example, each event agent may manage an event list (containing information of an event and an influence event for routes on the area managed by the event agent) and a candidate event list (containing information of candidates of an event for routes on the area managed by the event agent).

In the embodiment of FIG. 4, the event agent EA2 manages events of an area (indicated as "DA2" on the region A of FIG. 4) by the event list of the event agent EA2 and the candidate event list of the event agent EA2 based on car probe data from the mobile object 10 on the area DA2. For example, the event agent EA2 assigned to the area DA2 is executable to generate an event based on the information from the mobile object 10.

In one embodiment, each mobile object server 220 is operable to receive information from the mobile object 10 in the region A assigned to the mobile object server 220. The mobile object server 220 determines the target route where the mobile object 10 is located. The mobile object server 220 sends the information to one event server 210 assigned to a region A where the mobile object 10 is located, and thereby requests the event agent EA2 assigned to the area DA2 where the target route is located to send an event list containing information of an event on the target route and the influence event of the target route.

The mobile object server 220 executes the mobile object agent MOA1 for the mobile object 10 to provide the mobile object 10 with information that assists the mobile object 10 with traveling in the area DA2 based on the information of the event on the other route and the influence event of the target route. In the embodiment of FIG. 4, the mobile object agent MOA1 receives, from the event agent EA2, the event information of the route on which the mobile object 10 exists, and provides the mobile object 10 with the event information (e.g., information of closure).

Figure 5:
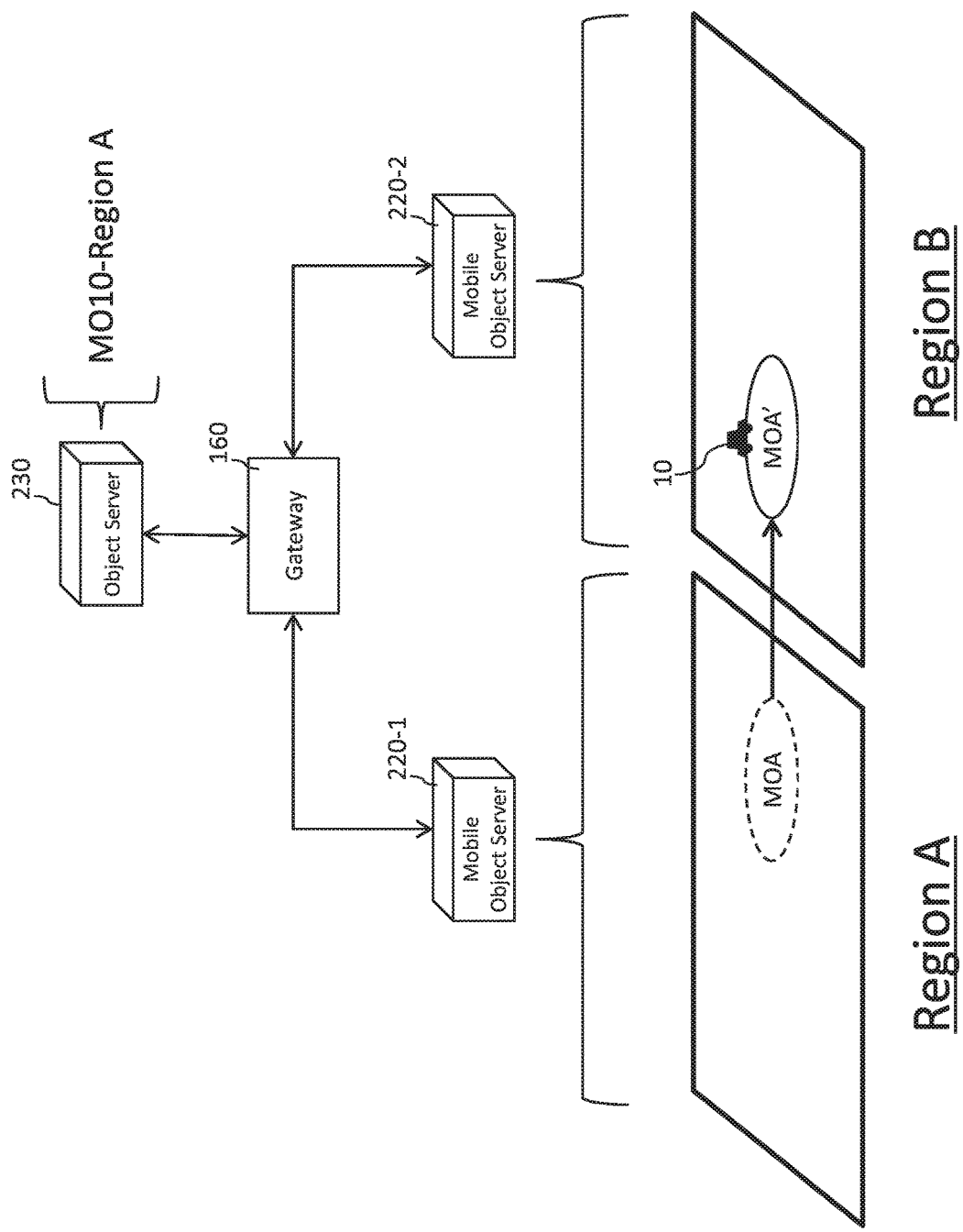
FIG. 5 shows management of mobile object by the mobile object server 220 and object server 230 according to one embodiment.

FIG. 5 shows management of a mobile object 10 by the mobile object servers 220 and object server 230, according to an embodiment of the present invention. The mobile object server 220-1 may transfer the mobile object agent to the mobile object server 220-2 assigned to a neighboring region in response to the mobile object 10 moving to the neighboring region. In this embodiment, in response to a mobile object 10 traveling from region A to region B, the mobile object server 220-1 managing region A deletes the mobile object agent MOA for the mobile object 10, and a mobile object server 220-2 managing region B generates a mobile object agent MOA for the mobile object 10.

In this embodiment, the object agent 230 may store information that includes a mobile object server identifier MOS-ID that identifies one of the plurality of mobile object servers 220 executing the mobile object agent corresponding to the object agent 230. Just after the mobile object 10 arrives at region B, the mobile object server 220-2 has not been executing the mobile object agent for the mobile object 10. The mobile object server 220-2 is operable to receive information from the mobile object 10 in the region B assigned to the mobile object server 220-2.

Using the information from the mobile object 10, the mobile object server 220-2 obtains the mobile object server identifier MOS-ID from the object server 230 that manages the object agent for the mobile object 10 because the mobile object server 220-2 is not executing the mobile object agent for the mobile object 10. The mobile object server 220-2 requests a mobile object server 220-1 identified by the mobile object server identifier MOS-ID to transfer the mobile object agent for the mobile object 10. Then the mobile object server 220-1 managing region A transfers the mobile object agent to the mobile object server 220-2 assigned to a neighboring region B in response to the request.

Figure 6:
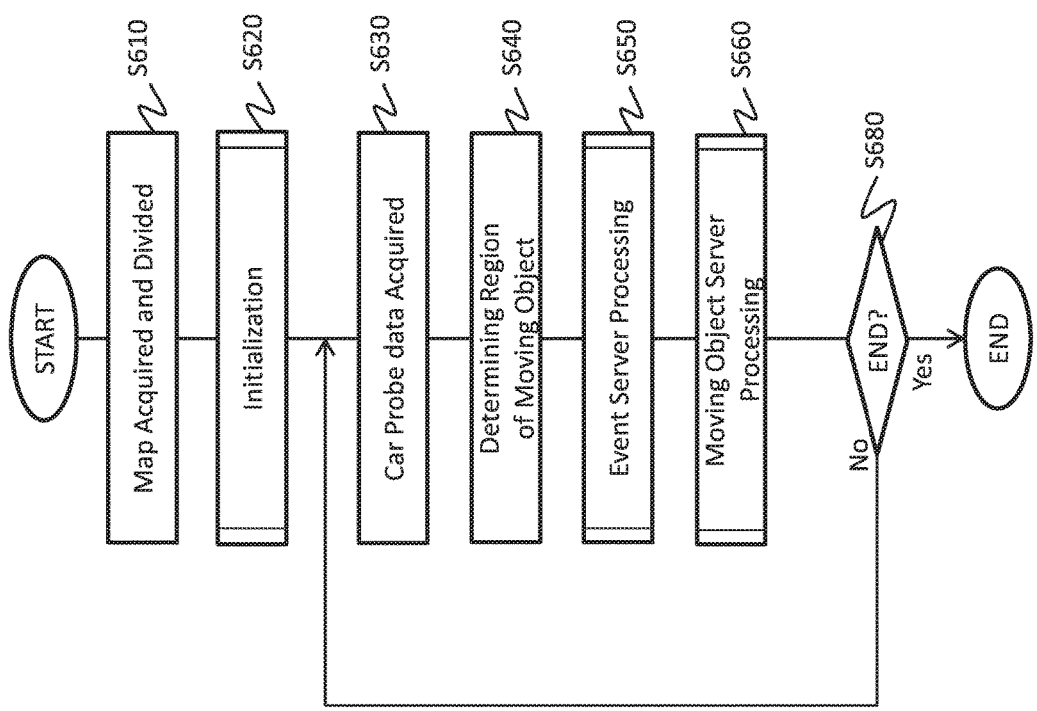
FIG. 6 shows an operational flow of an exemplary configuration of the system 100 according to the present embodiment.

FIG. 6 shows an operational flow of a system, according to an embodiment of the present invention. The present embodiment describes an example in which the system 100 performs the operations from S610 to S680 shown in FIG. 6 to manage mobile objects, such as mobile object 10, and events on a map area. FIG. 6 shows one example of the operational flow of the system 100 shown in FIGS. 1-5, but the system 100 shown in FIGS. 1-5 is not limited to using this operational flows explained below. Also, the operational flow in FIG. 6 may be performed by other systems.

First, an acquiring section, such as the acquiring section 110, may acquire the map data of the geographic space to be managed by the system (S610). The acquiring section may acquire map data of a geographic space that includes one or more cities, one or more towns, and the like. The acquiring section may include map data of a geographic space including one or more states, countries, continents, etc. A dividing section, such as the dividing section 130, may divide the map area to generate a plurality of regions.

Next, the system may perform an initialization process for the mobile object (S620). The system may perform the process of S620 if a user (passenger) initializes a setting of a mobile object and any passengers of the mobile object, before starting to drive the mobile object.

After S620, a gateway apparatus, such as the gateway apparatus 160, of the system may acquire a car probe data from the mobile object (S630). Although the system may acquire the car probe data from the plurality of the mobile objects, the system acquiring a car probe data from one mobile object (which, may be referred to as "a target mobile object") is explained in the below description. The car probe data may include information detected by the target mobile object, such as current position information of the target mobile object, a speed and/or direction of the target mobile object, and event information observed by the target mobile object (e.g., occurrence of ABS, detection of obstacles, or the like). In one embodiment, the position information may include an edge ID of an edge on which the target mobile object exists and the distance between the current location of the target mobile object and the one end of the edge.

Next, the gateway apparatus may determine a region on which the target mobile object is traveling based on the position information of the car probe data of the target mobile object (S640). In one embodiment, the gateway apparatus may inquire a region manager, such as the region manager 140, about the region on which the moving exists. A determining section, such as the determining section 146, of the region manager may determine the region the target mobile object and provide the gateway apparatus with the information of the region of the target mobile object. The gateway apparatus may provide an event server, such as the event server 210, that manages the determined region and a mobile object server, such as the mobile object server 220, that manages the determined region with the car probe data.

Next, the event server that is provided with the car probe data of the target mobile object may process events for the mobile objects (S650). The event server may manage event information based on the car probe data for notification of events to the target mobile object.

After S650, the mobile object server that is provided with the car probe data of the target mobile object may manage a mobile object agent for the target mobile object (S660).

After S660, the system determines whether to end the process for the target mobile object (S680). In one embodiment, the gateway apparatus may determine whether the car probe date indicates the engine stop of the target mobile object. If the system determines not to end the process, then the system proceeds with the process of S630 for the target mobile object. If the system determines to end the process, then the system ends the process for the target mobile object, and may continue the process for other mobile objects.

As described above, the system manages mobile objects by utilizing mobile object agents realized by the plurality of the mobile object servers. Since the system can transfer the mobile object agent between the mobile object servers, it can efficiently manage the mobile objects traveling around the plurality of regions. Furthermore, the system collects car probe data from the mobile objects and manages events generated from the car probe data by utilizing the event agents. Since each event server divides a number of events occurring on its managing regions into a plurality of areas by utilizing the event agents, it can efficiently handle event information.

The process of S610 may be performed once before starting processes S620-S680. The process of S620-S680 may be performed for every mobile object.

Figure 7:
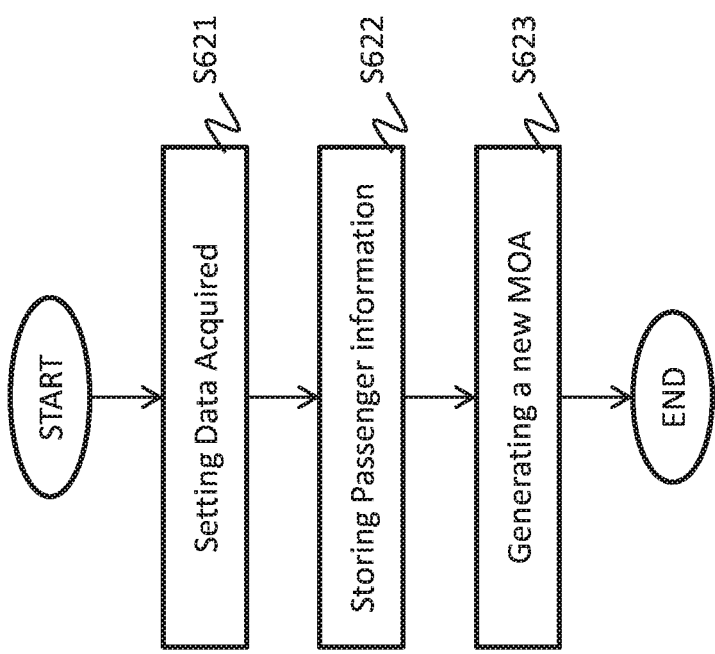
FIG. 7 shows an operational flow of S620 according to the present embodiment.

FIG. 7 shows an operational flow of an initialization process for a mobile object, according to an embodiment of the present invention. The present embodiment describes an example in which the system performs an initialization process, such as the initialization process of S620 of FIG. 6, through processes S621 to S623 shown in FIG. 7.

First, a gateway apparatus receives a setting data (including an ID of the mobile object, an ID(s) of passenger(s) and position information of the mobile object) from the mobile object (S621). The gateway apparatus determines one mobile object server that manages the mobile object based on the position information of the mobile object. The gateway apparatus provides the determined mobile object server with the setting data. Then, the determined mobile object server obtains information (e.g., ID(s) of the passenger(s)) of at least one passenger of the mobile object from the setting data of the mobile object.

Then, the mobile object server may request the object agent of the object server for the mobile object to store the information of the at least one passenger of the mobile object (S622). For example, each mobile object may be mapped to each object agent of the object servers based on values of the IDs of the mobile objects, and the mobile object server may identify one object agent corresponding to the ID of the mobile object based on the calculation using the ID. Then, the mobile object server may provide the object server managing the identified object agent with the setting data including the position information, the ID of the mobile object, and ID(s) of passenger(s) of the mobile object via the gateway apparatus.

Next, the object server stores the information of passenger(s) on an object agent. In one embodiment, each of passengers may be preliminarily mapped to each of the passenger servers based on values of the IDs of passengers, and the passenger servers may have information of passengers. The object server may identify one passenger server corresponding to the ID of a passenger based on the calculation using the ID. The object server may receive, via the gateway apparatus, the information of passengers from the passenger server corresponding to the ID. Then, the object server may store or update the information of the mobile object and the passengers of the mobile object, in the object agent for the mobile object. The object server may include the information of a region that the mobile object currently exists, in the object agent.

Next, the mobile object server 220 managing the region in which the mobile object 10 exists generates a new mobile object agent for the mobile object 10 (S623). In one embodiment, the mobile object server 220 may copy the information of the object agent for the mobile object 10 to the newly generated mobile object agent. For example, the mobile object server 220 may store the information of the mobile object 10 and the information of the at least one passenger of the mobile object 10 in the newly generated mobile object agent for the mobile object 10.

Figure 8:
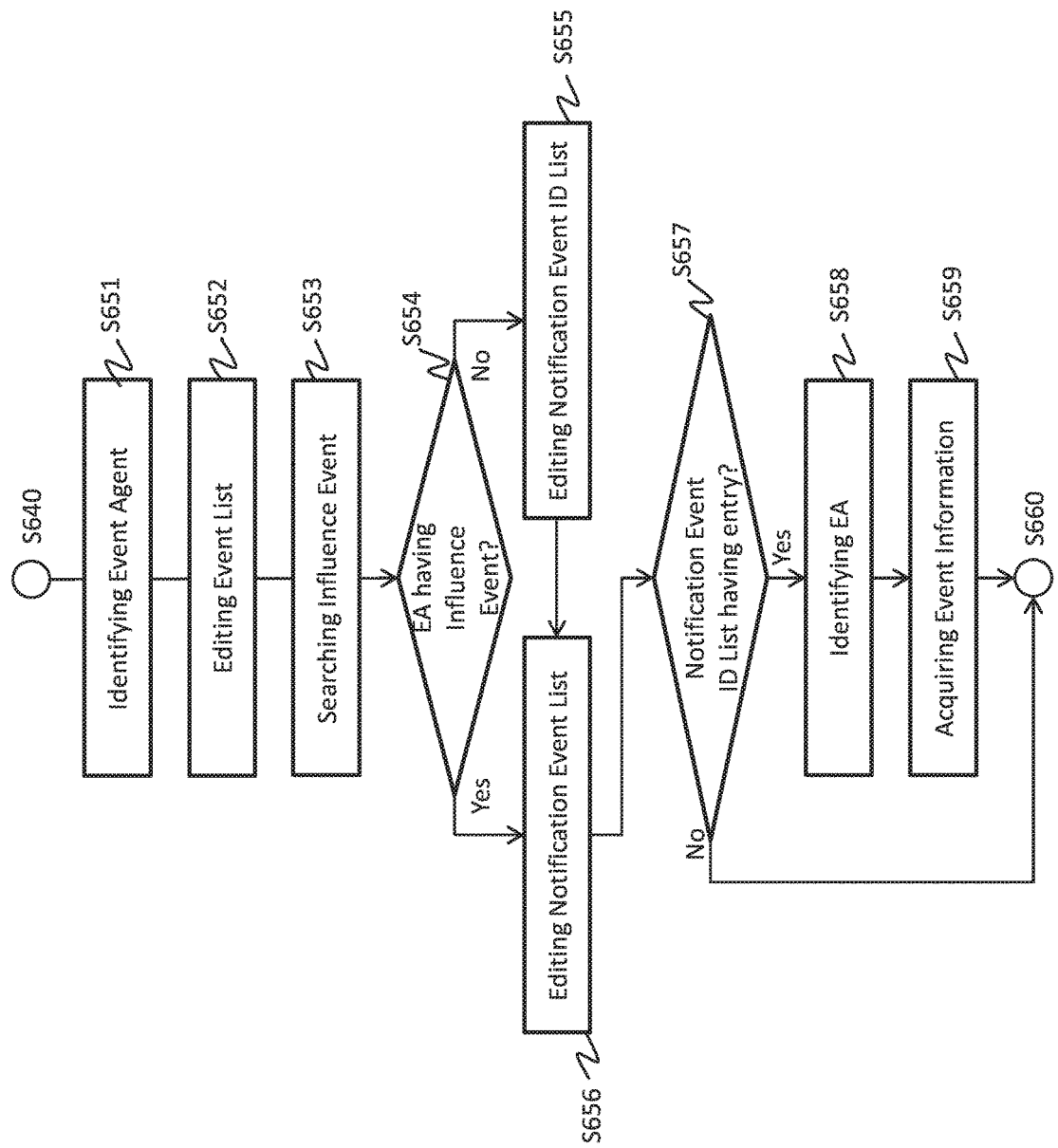
FIG. 8 shows an operational flow of S650 according to the present embodiment.

FIG. 8 shows an operational flow of event processing, according to an embodiment of the present invention. The present embodiment describes an example in which the system performs event processing, such as the event processing of S650 of FIG. 6, through processes S651 to S659 shown in FIG. 8.

First, the event server may identify an event agent (S651). In one embodiment, the event sever determines one event agent from the plurality of event agents based on the position information of the target mobile object. The determined event agent may be referred to as "target event agent." For example, the event server determines a target route (or an edge of the map data) of the target mobile object based on the position information and the map data, and selects, as a target event agent, an event agent that manages an area including the target route of the target mobile object indicated by the car probe data. In another embodiment, the car probe data of a target mobile object may include the information of the target route of the target mobile object. An edge may be a discrete section of a route which a mobile object 10 should complete traveling through before the route may split or diverge into different paths. For example, an edge may be a segment of road located between two intersections, with no alternate side streets.

Next, the event server may edit event lists by the target event agent based on the car probe data (S652). In one embodiment, the target event agent may generate or update information of events (e.g., an edge that an event occurs, an event ID, a location of an event, and content of event) of the target route on the event list based on information of the car probe data. The event of the target route may be referred to as a "target event."

Next, the event server may search, by the target event agent, an influence event on the target route on the area of the target event agent based on the car probe data (S653). The influence event of the target route relates to an event on another route within a threshold distance (e.g., a threshold travelling distance of the target route, a threshold number of edges away from the target route, and/or a threshold travelling time from the target route).

In one embodiment, the target event agent itself may search routes (or edge IDs) apart from the target route within the threshold distance based on the topology information of routes in the regions, or may request other entities (e.g., a server) to search for routes (or edge IDs).

Next, the event server may determine whether the event list of the target event agent includes event entries corresponding to all influence events of the target route searched at S653 (S654). In one embodiment, the target event agent determines whether edges of the influence events are listed as edge IDs of events in the event list.

If an area managed by a target event agent includes the routes (edges) of all influence events relating to an event, then an event list of the target event agent includes corresponding event entries of all influence events. However, if the routes (edges) of any influence events are managed by other event agents, then the event list may not include corresponding event entries of all influence events. If the decision is positive, then the event server proceeds with the process S655 and if negative, the event server proceeds with the process S656.

At S655, the event server may edit a notification event ID list by the target event agent. The notification event ID list includes IDs of influence events and edge IDs of the influence events that are determined to be not included in the event list of the target event agent at S654. In other words, the notification event ID list is a list of event IDs of influence events that are not managed by the target event agent. Then, the event server may proceed with the process of S656.

At S656, the event server may edit a notification event list for the target mobile object, by the target event agent. The notification event list is a list of events that may be helpful to the target mobile object traveling on the target route. The notification event list may include target events and influence events of the target events. The target event agent may add entries of the target events and the influence events in its managing event list for notification.

Next, the event server determines, by the target event agent, whether the notification event ID list has at least one entry (S657). If the decision is positive, then the event server proceeds with the process of S658, and if negative, then the event server ends the process of S650.

At S658, the event server may identify, by the target event agent, an event agent that manages an event list including events in the notification event ID list. The determined event agent may be referred to as "remote event agent."

Next, the event server may acquire information of events in the notification event ID list (S659), and end the process S650. In one embodiment, the target event agent may receive information of events in the notification event ID list from the remote event agent, and edit the notification event list based on the acquired information. In another embodiment, the target event agent may add entries of the influence events in the notification event ID list based on the acquired information.

FIG. 9 shows an illustrative example of an event list, according to an embodiment of the present invention. As described in FIG. 9, the event list may include edge IDs of events, event IDs of events, locations of events, specific contents of events, and influence events relating to events. In this embodiment, each route is represented as "edge." For example, this event list indicates that an event (identified as "Eve 0214") has occurred along the full length of edge 0001 on the area, that the event has limited the speed to 30 km/h, and that edge 0001 includes an influence event identified as "Eve 0114." The event list also indicates that an event (identified as "Eve 0114" on edge 0002) has occurred 32 m from the 1st node on edge 0002 on the area, that the event is a closure of a route, and that edge 0001 includes influence events identified as "Eve 0214" on edge 0001, "Eve 0421" on edge 0003, etc. In one embodiment, the target event agent may add a new entry corresponding to an event detected by the car probe data, in the event list.

According to the first entry in the event list of FIG. 9, the edge 0001 has influence event Eve 0114. This may mean that a mobile object traveling on the edge 0001 is influenced by the event Eve 0114 that has occurred apart from edge 0001 within a threshold distance. In response to receiving the car probe data including the position information indicating that the target mobile object is traveling on the edge 0001, the target event agent searches and obtains routes (edge IDs) apart from the target route (edge 0001) within the threshold distance, and then finds neighboring edge 0002 as a result. In response to receiving the car probe data including the position information of the edge 0001, the target event agent determines whether the edge of influence event (edge 0002) corresponding to the target route is listed as edge IDs in the event list.

The target event agent assigned to the area may generate or update a candidate event based on information from the target mobile object. In one embodiment, the target event agent may generate or update candidate events on the candidate event list including information of a plurality of edges on the area of the event agent based on information of the car probe data.

Although the event list of FIG. 9 includes information of influence events, the information of the influence events may be managed by another list. In one embodiment, the event agent may manage both a first event list containing information of an event on the target route and a second event list containing information of the influence event.

FIG. 10 shows an illustrative example of a candidate event list, according to an embodiment of the present invention. As described in FIG. 10, the event list may include edge IDs of candidate events, counts of detecting candidate events, locations of candidate events, and specific contents of candidate events for each candidate event. For example, this candidate event list indicates that evidence of an event (congestion) has been observed twice along the full length of edge 0009 on the area, and that evidence of an event (skid) has been observed once at a point 15 m from the 2nd node on edge 0013 on the area.

The target event agent may determine whether to change a candidate event in the candidate event list to an event in the event list. In one embodiment, the target event agent may upgrade the candidate event to the event based on information from other mobile objects. In this case, the target event agent counts occurrences of a candidate event observed by a plurality of mobile objects (including the target mobile object and other mobile objects). If the count of a candidate event exceeds a threshold value, then the target event agent determines that the candidate event is upgraded to an event. In one embodiment, in response to the upgrade, the target event agent deletes the entry of the candidate event from the candidate event list, and generates a new entry of an event corresponding to the deleted candidate event. The event servers may set the same or different criteria for upgrading candidate events among the plurality of event agents.

FIG. 11 shows an illustrative example of a notification event list, according to an embodiment of the present invention. As described in FIG. 11, the notification event list may include edge IDs of target/influence events, event IDs of target/influence events, locations of target/influence events, and specific contents of target/influence events. For example, this notification event list indicates that an event (speed limit) has occurred along the full length of edge 0001 on the area, and that an event (closure) has occurred at a point 32 m from the 1st node on edge 0002 on the area.

Figure 12:
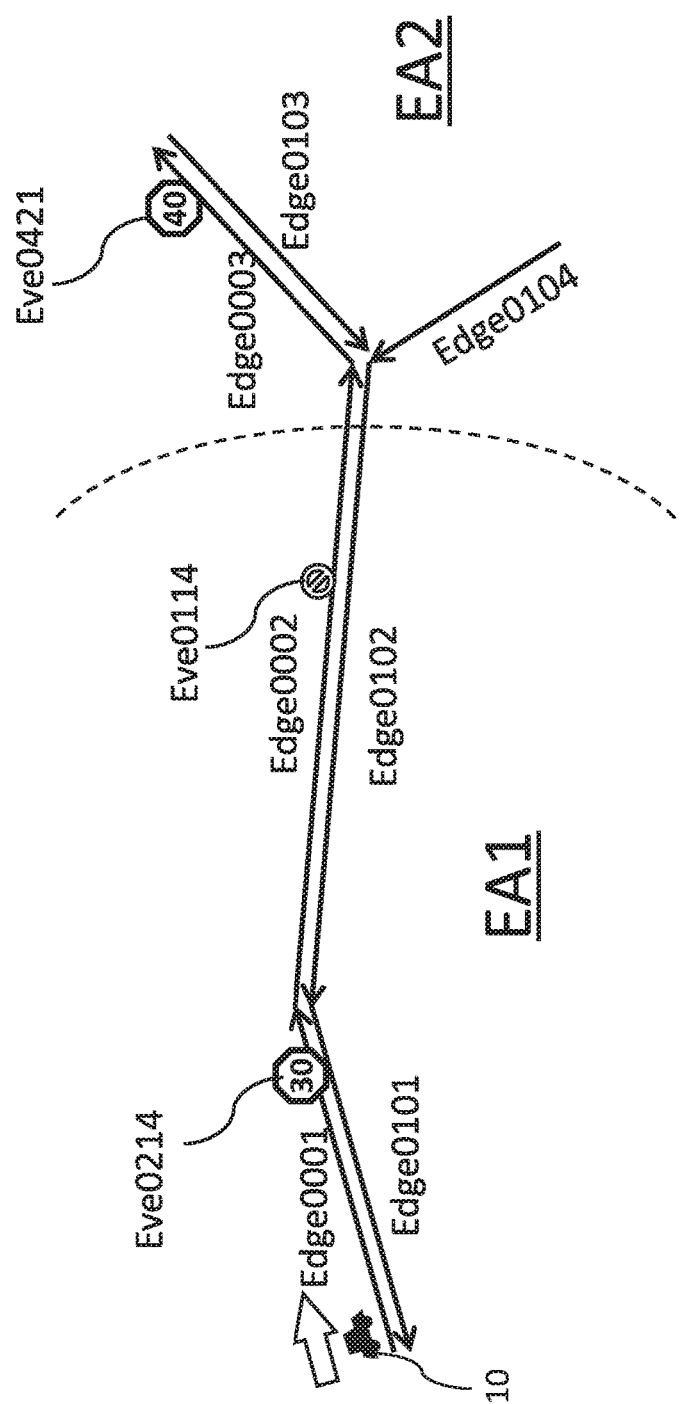
FIG. 12 shows a mobile object 10 and events according to one embodiment.

FIG. 12 shows a mobile object and events, according to an embodiment of the present invention. In the embodiment of FIG. 12, the target mobile object 10 is traveling eastbound on the edge 0001, which is the target route. The target event agent EA1 manages an area including the edge 0001, the edge 0002, the edge 0101, and the edge 0102, and the neighboring event agent EA2 manages an area including the edge 0003, the edge 0103, and the edge 0104.

Direction dependent edges are described in FIG. 12. However, edges may not be direction dependent according to other embodiments, and in such embodiments, the event agent may manage events, candidate events, and influence events with direction information. The target event agent EA1 manages an event (Eve 0214) on the edge 0001 as the target event in the event list. Since the edge 0002 is apart from the edge 0001 within the threshold distance, the target event agent EA1 also manages an event (Eve 0114) on the edge 0002 as an influence event in the event list. The target event agent EA1 manages a notification event list including the target event (Eve0214) and the influence event (Eve 0114) for the target mobile object 10.

In the embodiment of FIG. 12, the mobile object agent managing target mobile object requests the event agent EA1 that manages the target event (e.g., Eve 0214) and the influence event (e.g., Eve 0114) to send the notification event list including the target event and the influence event. In another embodiment, the mobile object agent may request the remote event agent EA2 that manages the information of influence event(s) (e.g., Eve0421) to send a notification event list containing information of the influence event(s) if the influence event is located outside of the area including the target route (Edge 0001).

Figure 13:
FIG. 13 shows an operational flow of S660 according to the present embodiment.

FIG. 13 shows an operational flow of mobile object processing, according to an embodiment of the present invention. The present embodiment describes an example in which the system manages the target mobile object, such as in S660 of FIG. 6, through processes S661 to S669 shown in FIG. 13.

At S661, the mobile object server may determine whether the mobile object agent for the target mobile object exists in the region determined to be the region of the mobile object, such as the region determined at S640. In other words, the mobile object server determines whether the mobile object server manages the mobile object agent of the target mobile object. If the decision is positive, then the mobile object server proceeds with the process S667, and if negative, the mobile object server proceeds with the process S662.

At S662, the mobile object server may identify an object server that includes the object agent containing the information of the target mobile object. In one embodiment, the mobile object server may identify the object server in the same manner described in S622.

Next, at S663, the mobile object server may inquire the object server 230 identified at S662 for the location of the mobile object agent of the target mobile object. The object server may refer to the object agent of the target mobile object, obtain information of the mobile object server that currently manages the mobile object agent MOA of the target mobile object, if it exists, and provide the mobile object server with the information.

Next, the mobile object server may determine whether the mobile object agent for the target mobile object exists in any other regions. In other words, the mobile object server may determine which mobile object server manages the mobile object agent for the target mobile object from the plurality of mobile object servers managing other regions, at S663. If the decision is positive, then the mobile object server proceeds with the process S666, and if negative the mobile object server proceeds with the process S665.

At S665, the mobile object server generates a new mobile object agent MOA for the target mobile object. The mobile object server may generate the mobile object agent MOA for the target mobile object by obtaining information of the target mobile object from the object server that includes the object agent containing the information of the target mobile object. In one embodiment, the mobile object server may generate the new mobile object agent in the same manner described in S623. The mobile object server may also communicate with the object server via the gateway apparatus, and register the current region of the target mobile object in the object agent corresponding to the target mobile object. By generating the new mobile object agent, the system can handle a new mobile object 10 that has been not managed by the mobile object server.

At S666, the mobile object server may transfer the mobile object agent from the other mobile object server determined to manage the mobile object agent for the target mobile object at S664. In one embodiment, the mobile object server may receive information of the mobile object agent for the target mobile object from the other mobile object server, and generate a new mobile object agent including the received information. The mobile object server may also communicate with the object server via the gateway apparatus, and register the current region of the target mobile object in the object agent of the target mobile object.

Next, at S667, the mobile object server may receive a notification event list for the target mobile object. In one embodiment, the mobile object server first determines the target route where the target mobile object is located. Then, the mobile object server may request the event agent that manages the information of target event(s) and influence event(s) corresponding to the target route to send a notification event list containing information of the target event(s) and influence event(s) of the target route.

At S668, the mobile object server may update the current location of the target mobile object by the mobile object agent. In one embodiment, the mobile object agent for the target mobile object updates the current location of the target mobile object based on the position information of the car probe data.

At S669, the mobile object server may execute the mobile object agent for the target mobile object to provide the target mobile object with information that assists the target mobile object with traveling in the geographic space based on the information included in the event list. In one embodiment, the mobile object agent may provide the target mobile object with information of events on the notification event list.

In one embodiment, the at least one mobile object server may execute the mobile object agent for the target mobile object to provide the target mobile object with information that assists the target mobile object with traveling in the geographic space based on the information of the at least one passenger of the target mobile object. For example, the mobile object agent may provide the target mobile object with an alert, a notice, and/or an action list relating events on the notification event list depending on a number of passengers (e.g., for guiding a car pool lane), the age, gender, license, real time information (e.g., driving history or sleep history), and characteristics of the passengers.

The action list is a list of actions recommended to passengers in response to the events (e.g., braking, accelerating, and/or steering of the target mobile object).

The action list may include commands to the target mobile object for automatic driving and/or driving assist. In one embodiment, the mobile object agent may include information that the passenger is sensitive to rough driving, and then the mobile object agent may provide commands to gently drive the target mobile object. In one embodiment, the mobile object agent may include information of driving skill of a driver passenger, and then provide different commands depending on the skill of the driver. The mobile object server may provide the target mobile object with the information via the gateway apparatus.

As described above, the mobile object server receives information from the target mobile object in the region assigned to the mobile object server, and generates the mobile object agent for the target mobile object if there is no mobile object server among the plurality of mobile object servers that is executing the mobile object agent.

Figure 14:
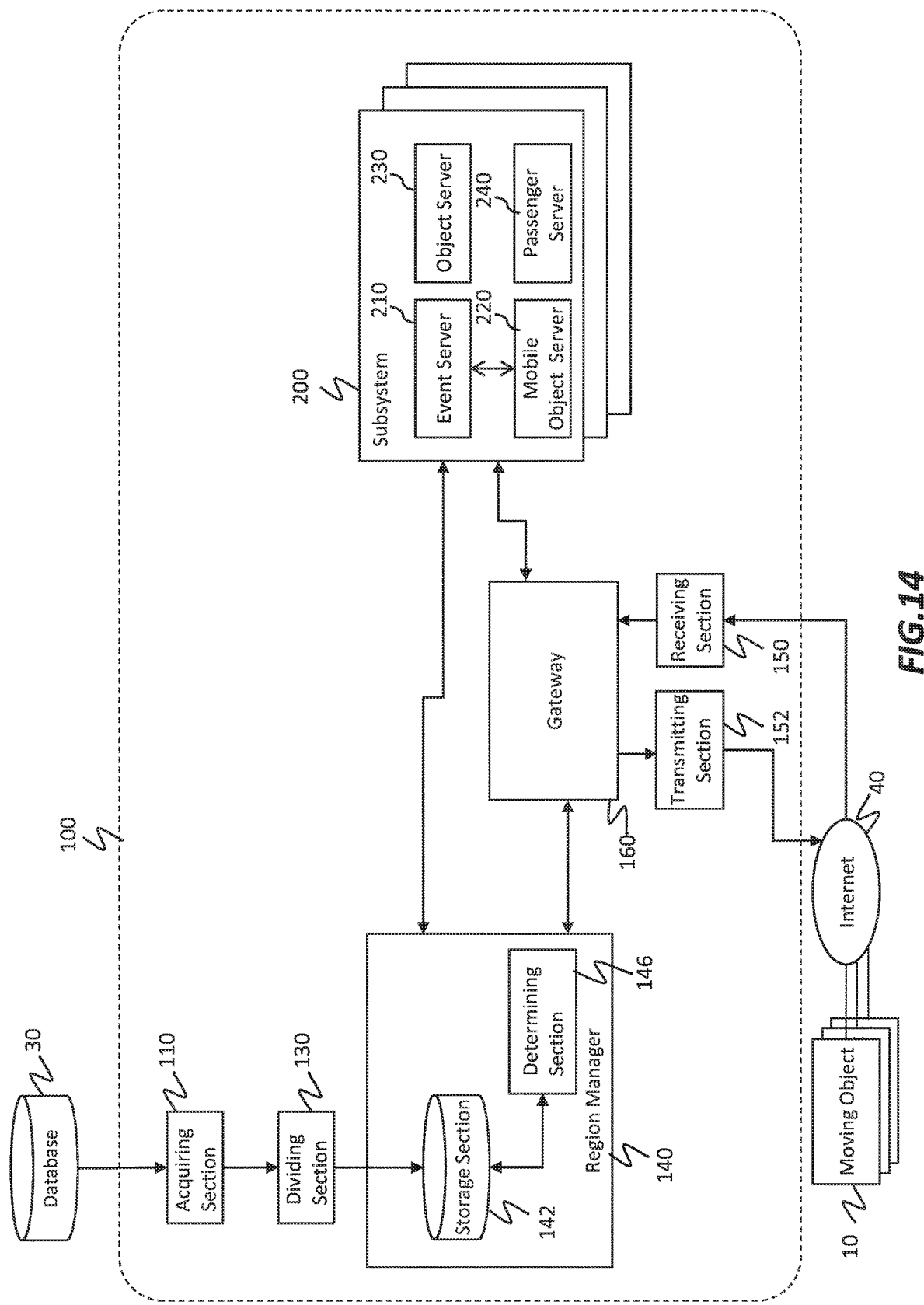
FIG. 14 shows a second exemplary configuration of the system 100 according to the present embodiment.

FIG. 14 shows an exemplary configuration of the system 100, according to an embodiment of the present invention. In this embodiment, each subsystem 200 includes an event server 210, mobile object server 220, an object server 230, and a passenger server 240. However, other embodiments are also possible, in which each subsystem 200 comprises any combination of singles or multiples of each server. In other embodiments, the system 100 may manage allocation of object agents of the object server 230 and passenger agents of the passenger server 240 in the subsystem 200. For example, the gateway apparatus 160 may change allocation of the object/passenger agents to the subsystems 200 to rectify the imbalance of data processing loads among the subsystems 200.

In the embodiment described above, the event server 210 may manage allocated event agents. In other embodiments, the system 100 may manage allocation of event agents to the event servers 210. For example, the gateway apparatus 160 may change allocation of event agents to the event servers 210 to rectify the imbalance of loads of processing events among the event servers 210. In the embodiment described above, the event server 210 causes each event agent to manage allocated divided area derived from a region. In other embodiment, the event server 210 causes at least one event agent to manage specific information regarding events (e.g., cross section of roads or other specific function(s) of a map, or, hurricane or other disaster/accident).

Figure 15:
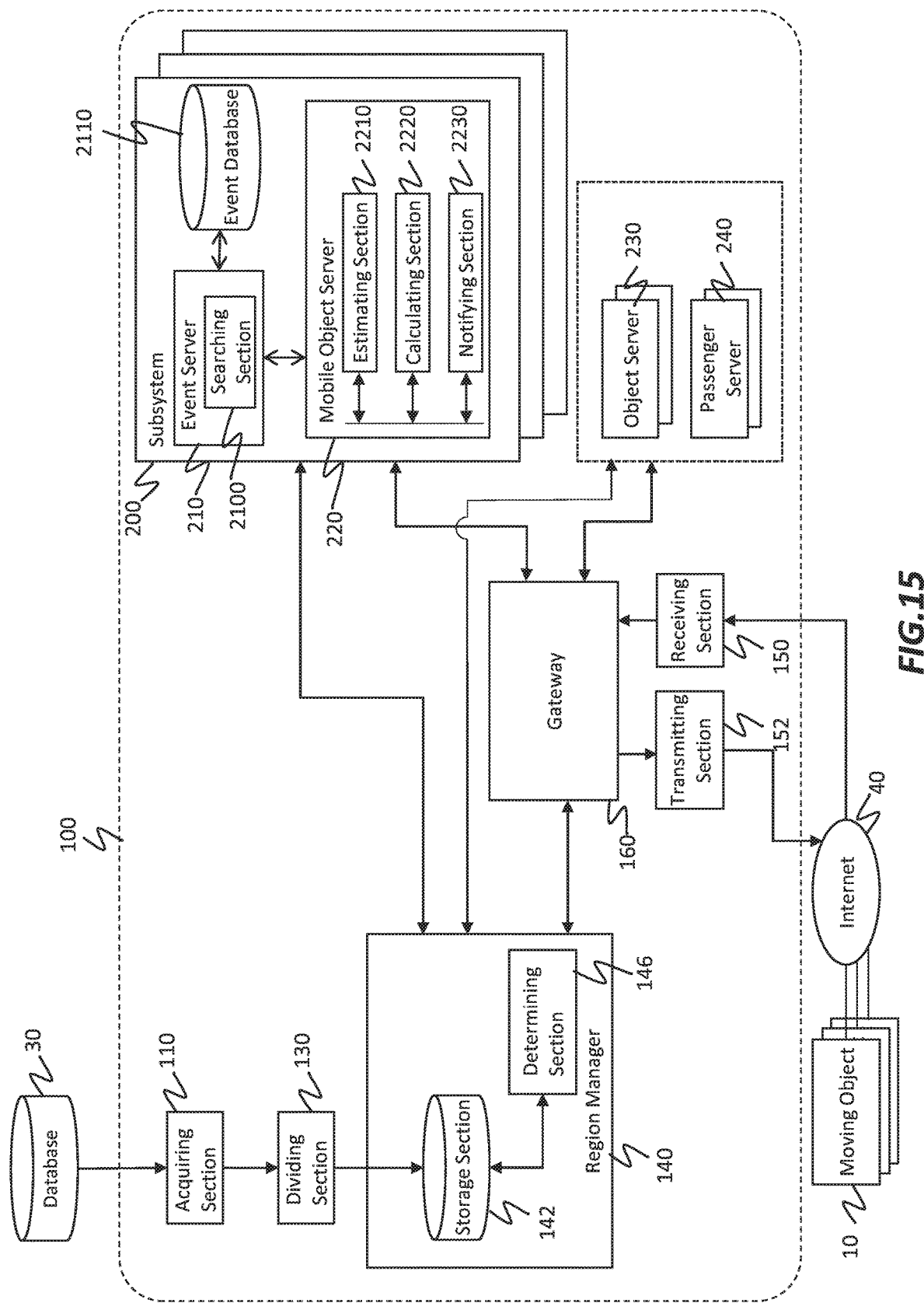
FIG. 15 shows a third exemplary configuration of a system 100 according to the present embodiment.

FIG. 15 shows an exemplary configuration of a system 100 according to another embodiment. In the system 100 according to the present embodiment, components that have substantially the same operation as components of the system 100 shown in FIG. 3 and FIG. 14 are given the same reference numerals, and descriptions thereof are omitted.

In the present exemplary configuration, the system 100 may be an apparatus that communicates with mobile objects 10. For example, the system 100 may be one apparatus overall, and may communicate with the mobile objects 10 via the receiving section 150 and the transmitting section 152.

The acquiring section 110 may acquire a dynamic map from the external database 30. The dynamic map may be a high-resolution digital map that includes not only information on geographic objects, but also event information concerning events that change in time series, such as accidents, traffic jams, and construction regulations. The dynamic map may be supplied to each mobile object 10 from the transmitting section 152.

The storage section 142 may store the history of position information of each mobile object 10, i.e. the travel history, according to the determining section 146 in the manner described above.

The event server 210 may include a searching section 2100 that searches for events of a plurality of edges in the geographic space. The searching section 2100 may register event information in the event database 2110. The searching section 2100 may supply the event information to a notifying section 2230, described further below, in the mobile object server 220.

The mobile object server 220 may include an estimating section 2210, a calculating section 2220, and the notifying section 2230.

The estimating section 2210 may estimate a plurality of route sets that each include an expected route of a mobile object 10 that moves in the geographic space and a route parameter indicating the possibility of passage on the expected route. The plurality or route sets include the possible routes the mobile object 10 may move from a current edge. The expected route of the mobile object 10 may be a route or course that the mobile object 10 is expected to travel when moving from the current geographic location to another geographic location. The route parameter is the probability of passage on the expected route, as an example in the present embodiment, but may be another indicator that indicates the passage possibility, e.g. a numerical value that is not normalized and becomes larger according to the passage possibility. The estimating section 2210 may supply the calculating section 2220 with the estimation results.

The calculating section 2220 may calculate an edge parameter indicating the passage possibility for each edge included in the plurality of expected routes, from the plurality of route parameters for the estimated plurality of expected routes. The edge parameter is the passage probability on the edge, as an example in the present embodiment, but may be another indicator that indicates the passage possibility, e.g. a numerical value that is not normalized and becomes larger according to the passage possibility. The edge parameter may be calculated to be a higher value when there is no nearby edge that can be alternatively traveled on (e.g. if the edge is a bridge or the like). The calculating section 2220 may supply the calculation results to the searching section 2100 and/or the notifying section 2230.

The notifying section 2230 notifies the mobile object 10 about an event. For example, the notifying section 2230 may supply the mobile object 10 with event information supplied from the searching section 2100.

With the system 100 described above, a plurality of route sets that each include an expected route of the mobile object 10 and a route parameter (e.g. the passage probability) for the route are estimated, and the edge parameter (e.g. the passage probability) is calculated for each edge in the plurality of expected routes from the plurality of route parameters for the estimated plurality of expected routes. Accordingly, it is possible to provide the passage possibility for each edge. In this way, a search and/or notification for the event of each edge can be performed based on the edge parameters, for example.

Figure 16:
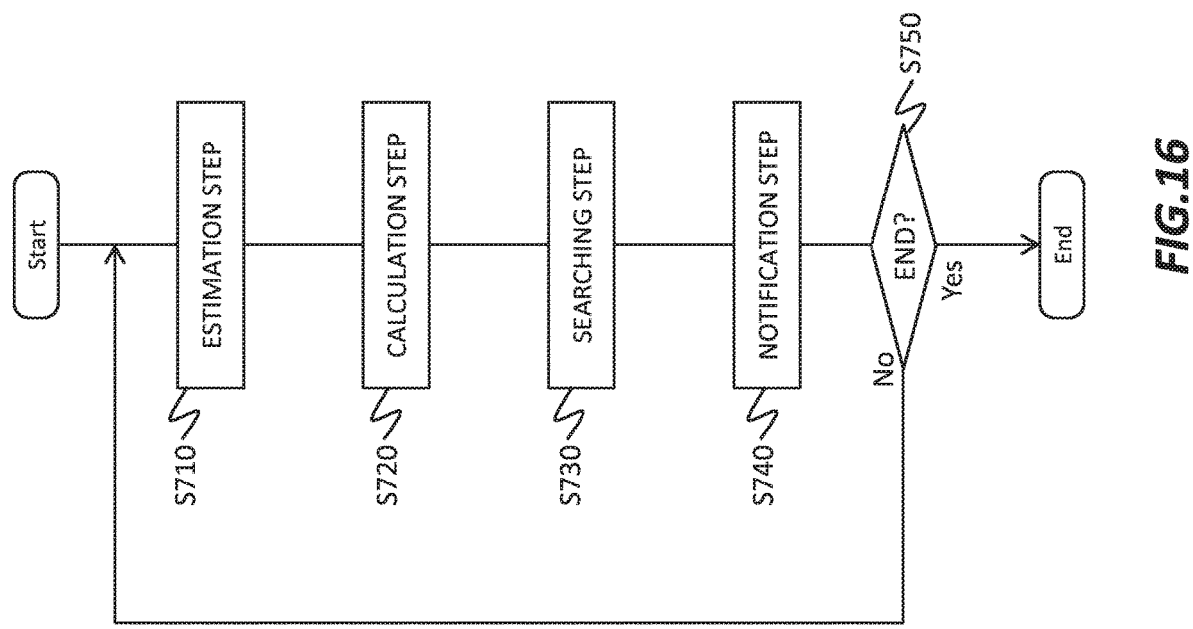
FIG. 16 shows an operational flow of the system 100.

FIG. 16 shows an operational flow of the system 100 according to the present embodiment. By performing this operational flow, the system 100 according to the present embodiment provides the passage possibility for each edge and performs a search and notification of events.

First, at S710, for one mobile object 10 that moves in the geographic space, the estimating section 2210 may estimate a plurality of route sets that each include an expected route for the one mobile object 10 and a route parameter of this expected route. For example, the estimating section 2210 may estimate the most probable path (MPP), which is the route that the one mobile object 10 is most likely to take in the future, as the expected route. The estimated route sets may include information concerning a destination of the expected route (e.g. latitude and longitude). The destination is estimated by the estimating section 2210, but may instead be registered by a person riding in the mobile object 10 (e.g. the driver) via the car navigation system. The estimating section 2210 may calculate the MPP using, in addition to the current travel history of the one mobile object 10, at least one of pattern matching using the previous travel history of the one mobile object 10, the travel state of another mobile object 10 at the current time, and the current time, day of the week, and the like. The estimating section 2210 may calculate the MPP by performing deep learning. The estimating section 2210 may calculate a plurality of MPPs for the one mobile object 10 using different methods, and may calculate one MPP using pattern matching and calculate another MPP using deep learning, for example. Furthermore, the estimating section 2210 may calculate the MPPs for a plurality of mobile objects 10 using different methods, and may calculate the MPP for the one mobile object 10 using pattern matching and calculate the MPP for another mobile object 10 using deep learning.

Here, the processes from S710 and onward may be repeated according to the judgment result at S750, which is described further below. In this case, at S710, the estimating section 2210 may sequentially update the route sets including the expected routes and the route parameters. For example, the estimating section 2210 may update the route sets every time the one mobile object 10 moves to a new edge (e.g. every time the one mobile object 10 passes through an intersection). The new edge may be the edge that is travelled through next. The estimating section 2210 may update the route sets every time a reference distance (e.g. 30 m) has been travelled or every time a reference time (e.g. 5 minutes) has passed. The estimating section 2210 may update the route sets when the one mobile object 10 moves off of the expected route. If an update condition for a set is not fulfilled (e.g. if the one mobile object 10 does not move to a new edge), the process of S710 does not need to be performed.

Next, at S720, the calculating section 2220 may calculate the edge parameter of each edge included in the plurality of expected routes, from the plurality of route parameters of the plurality of expected routes estimated for the one mobile object 10. For example, the calculating section 2220 may calculate the edge parameter of each edge included in the plurality of expected routes, based on the route parameter of each expected route including this edge. If the route parameter is the passage probability, the calculating section 2220 may calculate the passage probability of the edge as the edge parameter. For example, the calculating section 2220 may calculate the passage probability of each edge included in the plurality of expected routes by adding together the passage probability of each expected route including this edge. If the route parameter is not a passage probability, the calculating section 2220 may calculate the edge parameter by calculating the arithmetic mean or the weighted average of the route parameters in order to normalize the total value of the route parameter of each expected route. If one expected route passes through one edge a plurality of times, the calculating section 2220 may use the route parameter of the one expected route either one time or a number of times according to the number of times the edge is passed through, when calculating the edge parameter of the one edge.

If a set including an expected route and a route parameter is not updated in the process of S710 described above, the process of S720 does not need to be performed. Furthermore, the processes from S710 to S720 described above may be performed between S620 and S630 in FIG. 6. If it is judged that the system 100 is not to end the processing at S680 in FIG. 6, the system 100 may move to the process of S710.

Next, at S730, the searching section 2100 may search for a plurality of edge events in the geographic space. The searching section 2100 may search for events using car probe data from a plurality of the mobile objects 10 moving on an edge in the geographic space. The searching section 2100 may search for the events using the dynamic map acquired by the acquiring section 110, or may search for the events using information supplied from a manager of the road, a road traffic information communication system, and/or the like. If the search for events is performed using the car probe data, the process of S730 may be performed at S630 in FIG. 6. If the search for events is performed using information provided from the road traffic information communication system, the process of S730 may be performed before S630 in FIG. 6 or between S630 and S640.

The searching section 2100 may perform the search while prioritizing events of edges that have higher edge parameters. In this way, it is possible to reduce the amount of resources used in the search for events of edges that have a low passage possibility.

For example, the searching section 2100 may perform the search more frequently for edges with higher edge parameters. As an example, if the process of S730 is repeated a plurality of times, the searching section 2100 may perform the search during every repetition for the edges that have an edge parameter higher than a reference value, and may perform the search once every several repetitions for the edges that have an edge parameter lower than a reference value.

The searching section 2100 may set an event search range for a plurality of edges included in a plurality of expected routes, and may search for the event of each edge included in the search range. The search range may include only the edges in the expected routes, or may further include nearby edges that are not included in the expected routes. The events on edges that are in the search range but not included in the expected routes may be influence events. The searching section 2100 does not need to search for events outside the search range, but may perform this search.

The searching section 2100 may set the search range for each edge to span from the current position of the mobile object 10 to an edge that is farther away on an expected route, for expected routes having higher parameter values. In this way, in expected routes that have a high passage possibility, it is possible to assist with movement of the mobile object 10 by searching for events to distant edges in the route. Furthermore, if each expected route has a low route parameter (e.g. if the mobile object 10 has just started travelling or if the mobile object 10 has moved off the expected route), it is possible to assist with the movement of the mobile object 10 by performing a search focused on events near the current position.

If an expected route having a route parameter that is higher than a reference parameter value is present among the plurality of expected routes, the searching section 2100 may set the search range at each edge to span from the current position of the mobile object 10 to the destination on this expected route. If the route parameter is the passage probability, the reference parameter value may be 0.9, for example. In this way, in the case of an expected route that has a high passage possibility, it is possible to assist with the movement of the mobile object 10 by searching for events over the entire length of this route.

The searching section 2100 may set the search range to be within a greater distance range from the edge, for edges with higher edge parameters. In this way, for edges that have a high passage possibility, it is possible to assist with the movement of the mobile object 10 by searching widely for events of edges nearby this edge.

The searching section 2100 may set the search range to be within a shorter distance range from the edge, for edges that are near the destination among each of the edges included in the plurality of expected routes. In this way, it is possible to reduce the amount of resources used in the search for events of edges near the destination that have a low passage possibility. The searching section 2100 may set the search range to be within a greater distance range from the edge, for edges that are farther from the current position of the mobile object 10 among each of the edges included in the plurality of expected routes. In this way, it is possible to assist with the movement of the mobile object 10 by performing an early search for information concerning events that can occur when the mobile object 10 moves off of the expected route.

Next, at S740, the notifying section 2230 may notify the one mobile object 10 about an event. The notifying section 2230 may provide the notification while prioritizing events of edges that have higher edge parameters. In this way, it is possible to reduce the amount of resources used when providing notification of events of edges that have a lower passage possibility.

For example, the notifying section 2230 may provide notification more frequently for edges that have a higher edge parameter. As an example, if the process of S740 is repeated a plurality of times, the notifying section 2230 may provide the notification in every repetition for events of edges having an edge parameter that is higher than a reference value, and may provide the notification once in every several repetitions for events of edges having an edge parameter that is lower than a reference value.

The notifying section 2230 may set a notification range of events at a plurality of edges included in a plurality of expected routes, and may provide notification about the event of each edge included in the notification range. The notification range may include only the edges within the expected routes, or may further include nearby edges that are not included in the expected routes. The notification range may be the same range as the search range, or may be a partial range in the search range. The notifying section 2230 does not need to provide notification about events outside the notification range.

The notifying section 2230 may set the notification range for each edge spanning from the current position of the mobile object 10 to an edge that is farther away on an expected route, for expected routes that have a higher route parameter. In this way, it is possible to assist with the movement of the mobile object 10 by providing notification about events up to a farther edge on the route, for expected routes having a higher passage possibility. Furthermore, it is possible to assist with the movement of the mobile object 10 by providing notification focused on events near the current position, for each expected route that has a low route parameter.

The notifying section 2230 may set the notification range to be in a greater distance range from the edge, for edges that have a higher edge parameter. In this way, it is possible to assist with the movement of the mobile object 10 by widely providing notification of events of nearby edges, for edges that have a high passage possibility. In addition to or instead of this, the notifying section 2230 may set the notification range in the same manner as the method used for setting the search range described above for the searching section 2100.

The process of S740 described above may be performed at S669 in FIG. 13.

Next, at S750, the system 100 may determine whether to end the process for the one mobile object 10. If the system determines not to end the process, then the system may proceed with the process of S710 for the one mobile object. If the system determines to end the process, then the system may end the process for the target mobile object, and may continue the process for other mobile objects. This process may be performed at S680 in FIG. 6.

As a result of the operational flow described above, the edge parameter (passage possibility) of each edge included in a plurality of expected routes is calculated based on the route parameter (passage possibility) of each expected route including this edge. Accordingly, it is possible to easily calculate the passage possibility of an edge.

Figure 17:
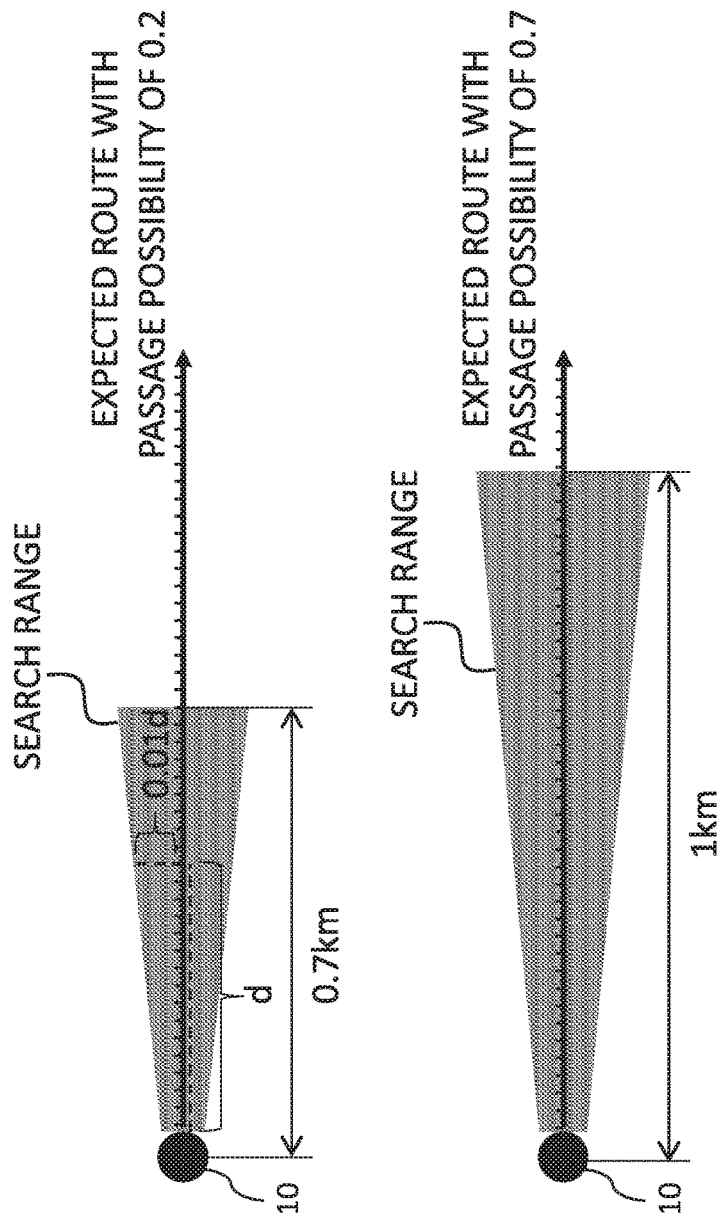
FIG. 17 shows the relationship among the distance from the mobile object 10, the passage probability serving as the route parameter, and the size of the search range.

FIG. 17 shows the relationship among the distance from the mobile object 10, the passage probability serving as the route parameter, and the size of the search range. The arrows that are thick solid lines in the drawing indicate expected routes, and each line portion between the scale markers on the expected routes indicates an edge. The hashed region indicates the event search range. In this drawing, the edges that intersect with the expected routes are omitted from being shown.

In the manner described above, the search range may be set to be in a greater distance range from the edge, for edges that are farther from the current position of the mobile object 10 among each of the edges included in the expected routes. As an example, if the distance from the current position of the mobile object 10 is "d" (in meters), a range that is 0.01 d from each edge on the expected route may be set as the search range.

Furthermore, the search range may be set at each edge spanning from the current position to an edge that is farther away on the expected route, for edges that have a higher route parameter. For example, the search range may be set spanning from the current location of the mobile object 10 to an edge that is at a maximum search distance in the expected route, and the maximum search distance may be greater for expected routes that have a higher route parameter. As an example, the maximum search distance may be 1 km if the passage probability serving as the route parameter is 0.7, and the maximum search distance may be 0.7 km if the passage probability is 0.2. This search range may be the event notification range, and the maximum search distance may be a maximum notification distance.

Figure 18:
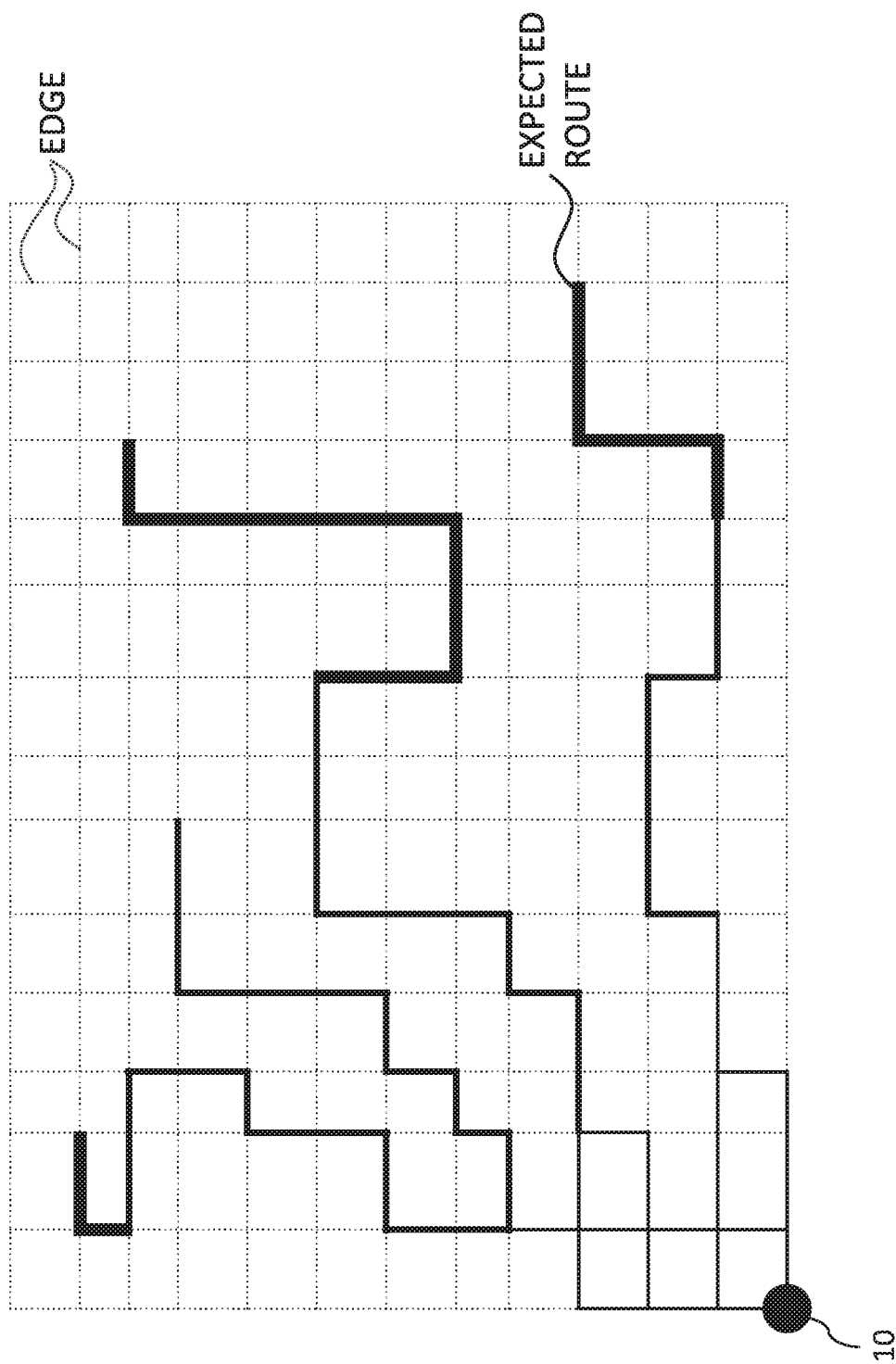
FIG. 18 shows a plurality of expected routes estimated for a mobile object 10 immediately after departing.

FIG. 18 shows a plurality of expected routes estimated for a mobile object 10 immediately after departing. The dotted lines in the drawing indicate edges, and the solid lines indicate expected routes. A greater thickness for the solid lines indicates a greater distance from the current position, a greater number of edges that have been passed, and/or positions closer to the destination. In this example, the plurality of expected routes each have approximately the same passage probability, and overlap near the mobile object 10.

Figure 19:
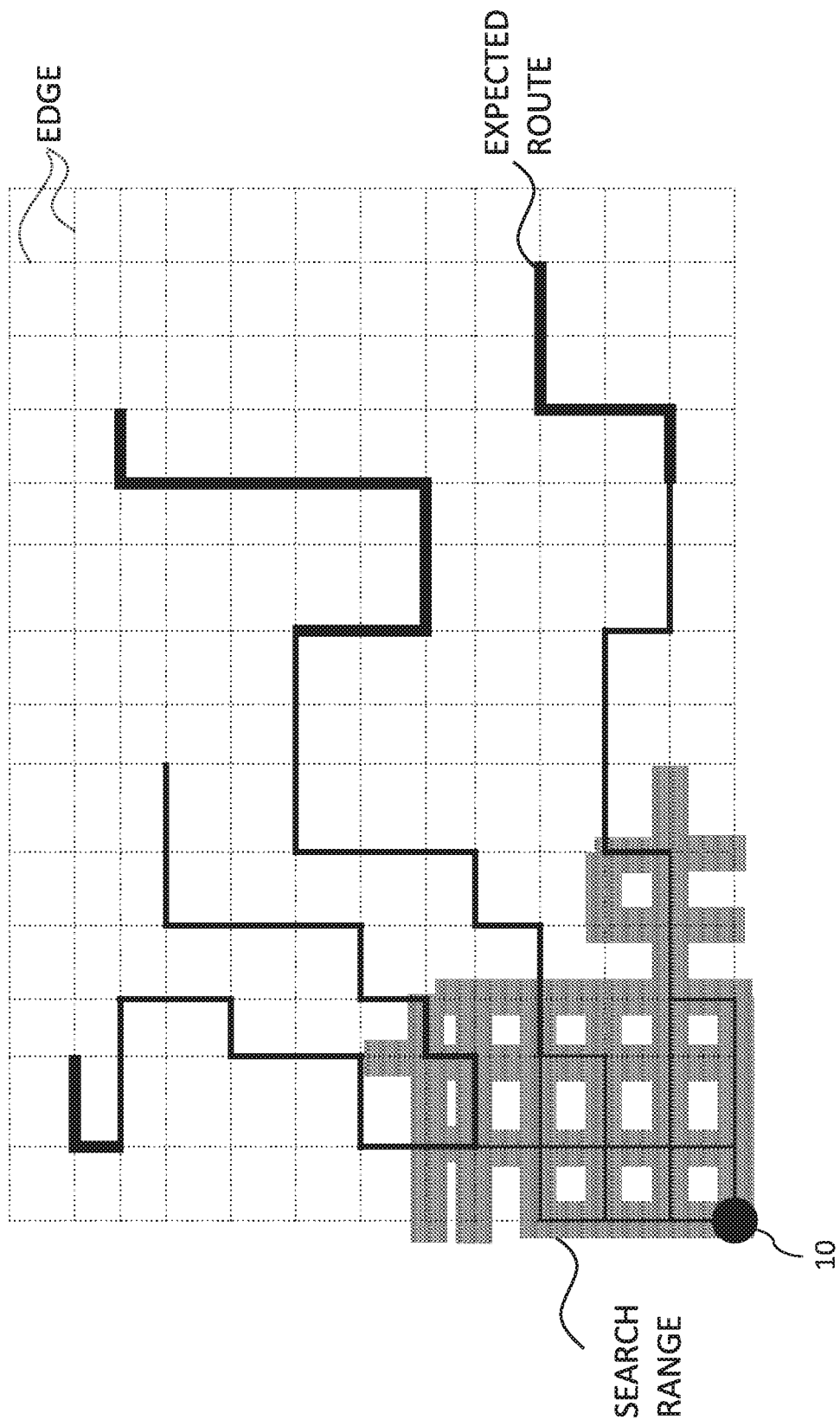
FIG. 19 shows the search range set using the expected route of FIG. 18.

FIG. 19 shows the search range set using the expected routes of FIG. 18. The hashed region in the drawing indicates the search range for events. In this example, the search range at each edge is set spanning from the current position of the mobile object 10 to an edge that is farther away on the expected route, for expected routes that have a higher route parameter. It should be noted that the search range at each edge is set focusing only on the region from the current position to a nearby edge, because each route parameter is low and approximately the same. Furthermore, the maximum search distance on each expected route is small and therefore difficult to show clearly, but the search range is set to be within a greater distance range from the edge for edges that are farther from the current position of the mobile object 10, among each of the edges included in the expected routes. This search range may be the notification range for events.

Figure 20:
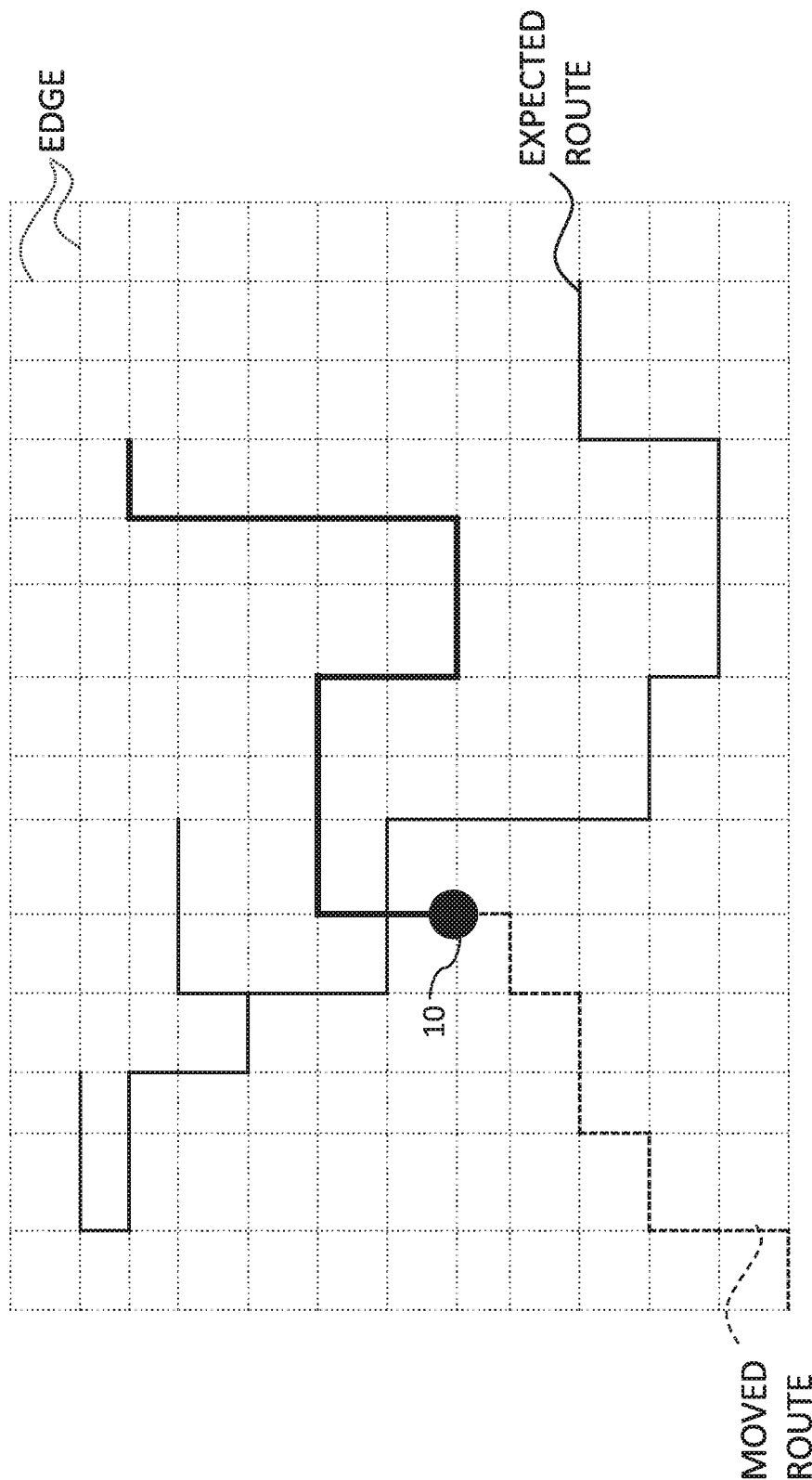
FIG. 20 shows a plurality of expected routes estimated after the mobile object 10 has moved from the state shown in FIG. 18.

FIG. 20 shows a plurality of expected routes estimated after the mobile object 10 has moved from the state shown in FIG. 18. The dashed lines in the drawing indicate the route on which the mobile object 10 moved, and the solid lines indicate the expected routes. It should be noted that, in the following drawings, a greater thickness of the solid lines indicates that the passage probability is higher. In this example, the mobile object 10 moves to the middle of the expected route leading toward the upper right in the drawing, among the plurality of expected routes shown in FIG. 18. Furthermore, the four expected routes for the mobile object 10 that is moving are estimated again, and the passage probability of the expected route leading to the upper right in the drawing is estimated to be higher (e.g. 0.9 here). It should be noted that the passage probability is estimated to be approximately the same value among the four expected routes that are newly estimated.

Figure 21:
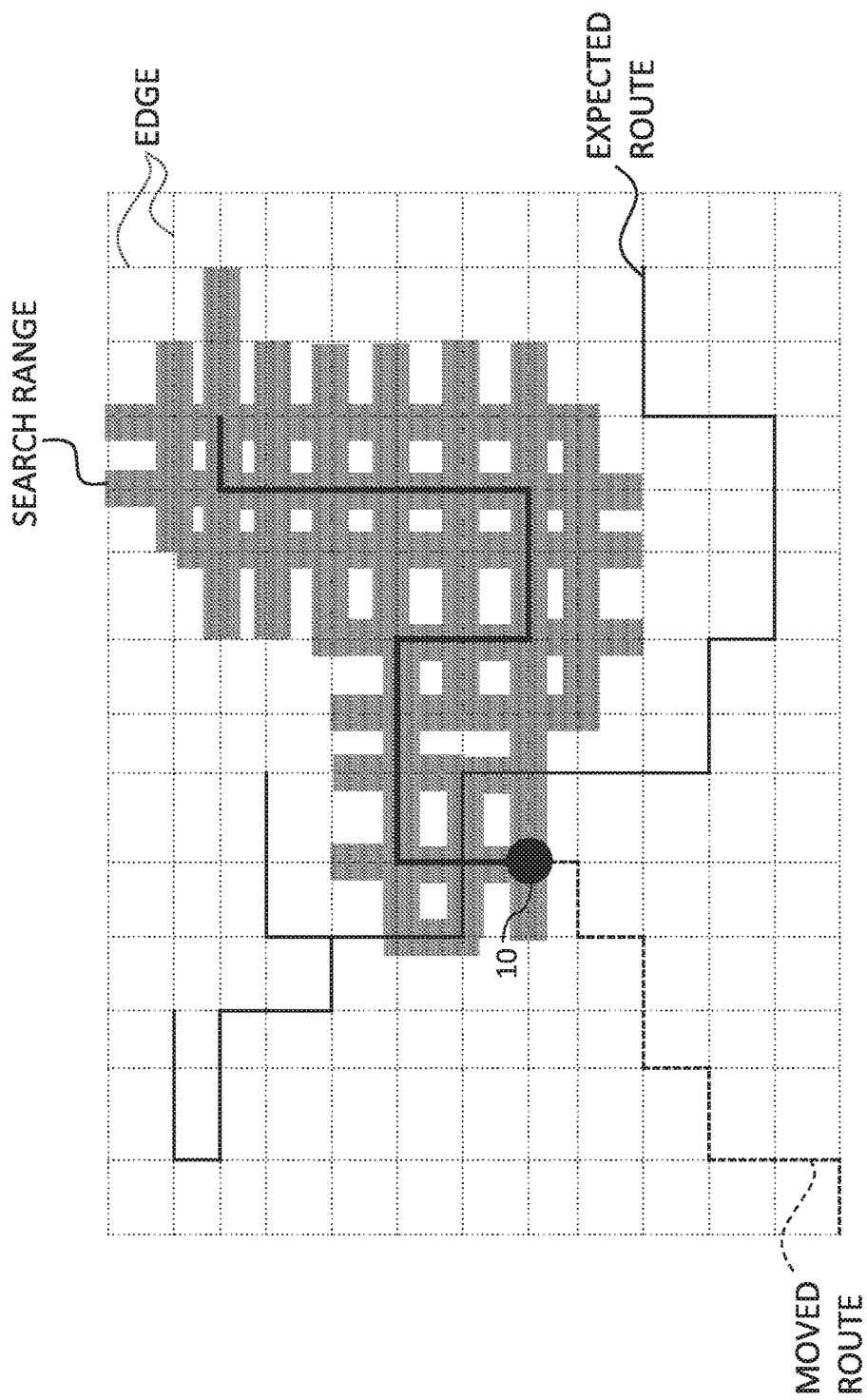
FIG. 21 shows the search range set using the expected route of FIG. 20.

FIG. 21 shows the search range set using the expected routes shown in FIG. 20. In this example, the search range is set in a greater distance range from the edge, for edges that have a higher passage probability, and as a result the search range is set focusing on a region near the edge of the expected route that leads toward the upper right in the drawing. Furthermore, the passage probability for this expected route is a high value of 0.9, and therefore the search range is set from each edge spanning from the current position of the mobile object 10 to the destination. Furthermore, the search range is set in a greater distance range from the edge for edges that are farther from the current position of the mobile object 10, among each of the edges included in the expected route, and as a result the search range is set to be wider when closer to the destination. This search range may also be the notification range for events.

Figure 22:
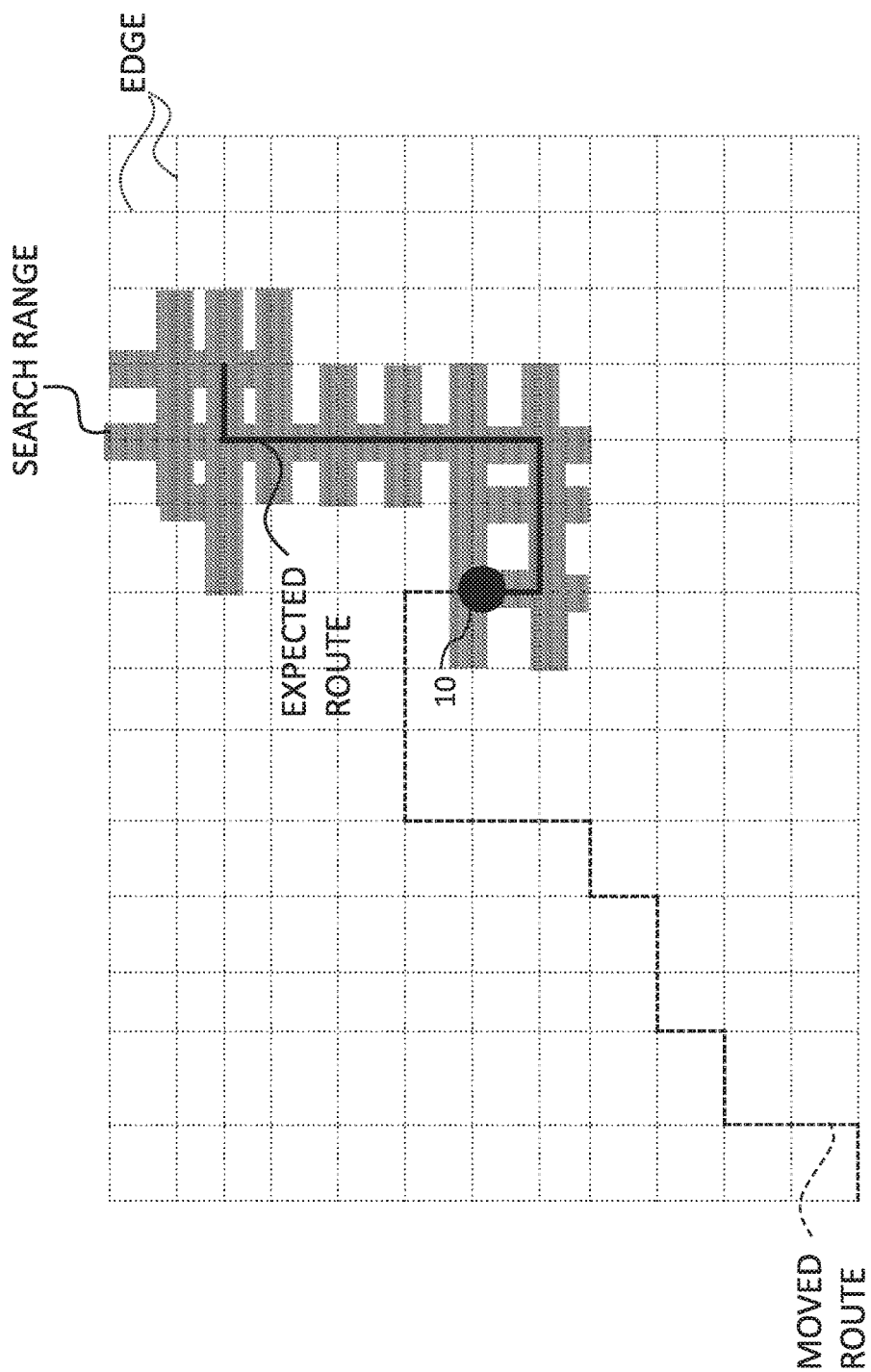
FIG. 22 shows the expected route estimated after the mobile object 10 has moved from the state shown in FIG. 20, and the search range that is set using this expected route.

FIG. 22 shows the expected route estimated after the mobile object 10 has moved from the state shown in FIG. 20, and the search range that is set using this expected route. In this example, the mobile object 10 moves farther on the expected route leading toward the upper right in the drawing, from among the four expected routes shown in FIG. 20. Furthermore, only one expected route is again estimated for the mobile object 10 during the movement, and the passage probability of this expected route is estimated to be 1. Therefore, the passage probability of each edge on this expected route is estimated to be 1, and the search range is set focusing on the region near these edges. Furthermore, since the passage probability of the expected route has a high value of 1.0, the search range from each edge is set spanning from the current position of the mobile object 10 to the destination. Yet further, the search range is set in a greater distance range from the edge for edges that are farther from the current position of the mobile object 10, among each of the edges included in the expected route, and as a result the search range is set to be wider when closer to the destination. This search range may also be the notification range for events.

In the embodiment described above, the calculated edge parameters are used in the search and/or notification of events, but may instead be provided to a manager of the road, a road traffic information communication system, and/or the like.

Furthermore, in the above description, the system 100 communicating with the mobile object 10 performs the operational flow shown in FIG. 16, but an apparatus mounted in the mobile object 10 may perform this operational flow, or this apparatus and the system 100 may cooperate to perform this operational flow. In these cases, instead of having the notifying section 2230 of the mobile object server 220 provide notification about the events to the mobile object 10, the mobile object 10 may provide the notification about the events to the driver or passenger.

Figure 23:
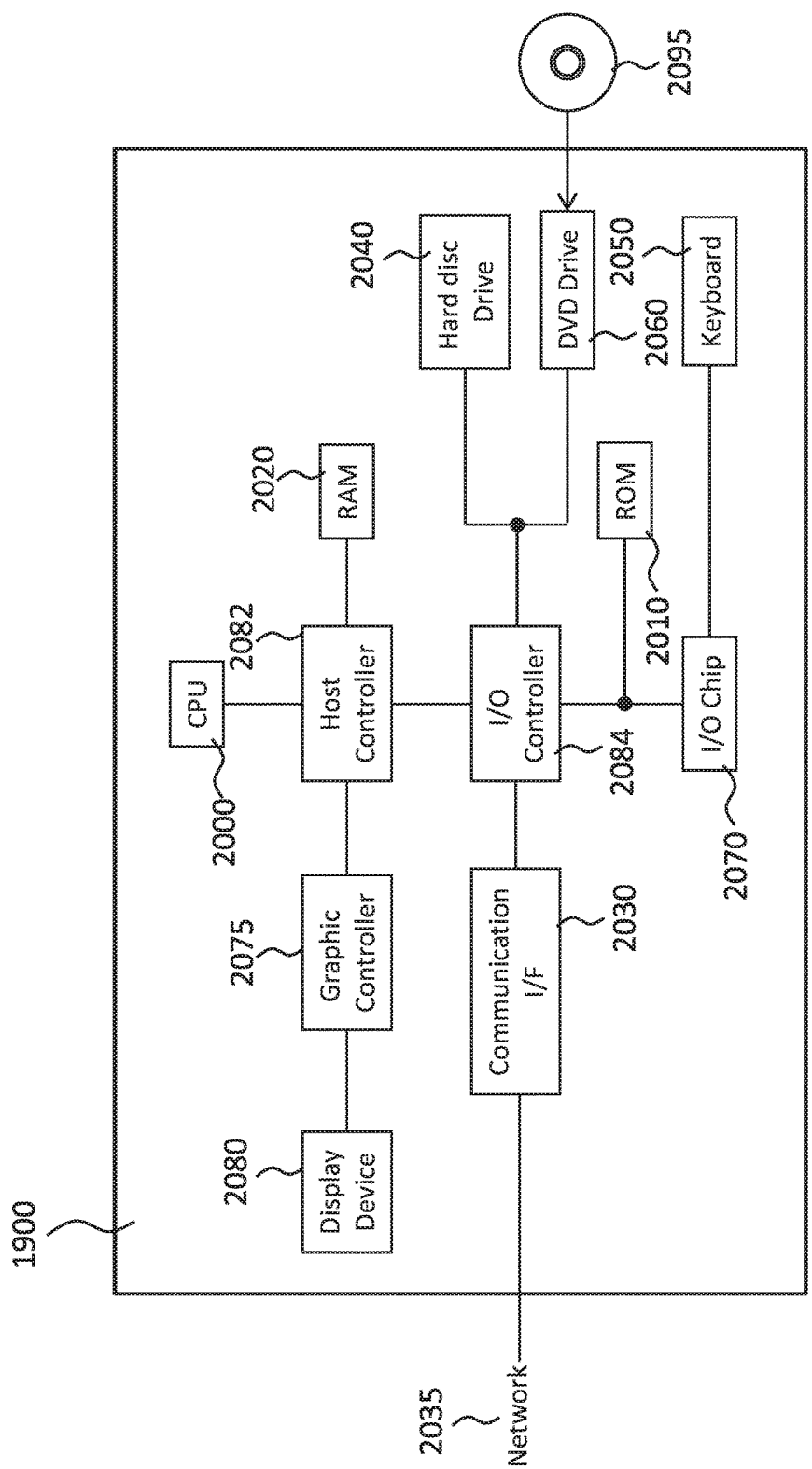
FIG. 23 shows an exemplary hardware configuration of a computer according to the embodiment of the invention.

FIG. 23 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 2000 to cause the computer 700 to perform certain operations associated with some or all of the blocks of flowcharts and block diagrams described herein.

The computer 700 according to the present embodiment includes a CPU 2000, a RAM 2020, a graphics controller 2075, and a display device 2080, which are mutually connected by a host controller 2082. The computer 700 also includes input/output units such as a communication interface 2030, a hard disk drive 2040, a DVD-ROM drive 2060 and an IC card drive, which are connected to the host controller 2082 via an input/output controller 2084. The computer also includes legacy input/output units such as a ROM 2010 and a keyboard 2050, which are connected to the input/output controller 2084 through an input/output chip 2070.

The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020 or in itself, and causes the image data to be displayed on the display device 2080.

The communication interface 2030 communicates with other electronic devices via a network 2035. The hard disk drive 2040 stores programs and data used by the CPU 2000 within the computer 700. The DVD-ROM drive 2060 reads the programs or the data from the DVD-ROM 2095, and provides the hard disk drive 2040 with the programs or the data via the RAM 2020. The IC card drive reads programs and data from an IC card, and/or writes programs and data into the IC card.

The ROM 2010 stores therein a boot program or the like executed by the computer 700 at the time of activation, and/or a program depending on the hardware of the computer 700. The input/output chip 2070 may also connect various input/output units via a parallel port, a serial port, a keyboard port, a mouse port, and the like to the input/output controller 2084.

A program is provided by computer readable media such as the DVD-ROM 2095 or the IC card. The program is read from the computer readable media, installed into the hard disk drive 2040, RAM 2020, or ROM 2010, which are also examples of computer readable media, and executed by the CPU 2000. The information processing described in these programs is read into the computer 700, resulting in cooperation between a program and the above-mentioned various types of hardware resources. An apparatus or method may be constituted by realizing the operation or processing of information in accordance with the usage of the computer 700-

For example, when communication is performed between the computer 700 and an external device, the CPU 2000 may execute a communication program loaded onto the RAM 2020 to instruct communication processing to the communication interface 2030, based on the processing described in the communication program. The communication interface 2030, under control of the CPU 2000, reads transmission data stored on a transmission buffering region provided in a recording medium such as the RAM 2020, the hard disk drive 2040, the DVD-ROM 2095, or the IC card, and transmits the read transmission data to network 2035 or writes reception data received from network 2035 to a reception buffering region or the like provided on the recording medium.

In addition, the CPU 2000 may cause all or a necessary portion of a file or a database to be read into the RAM 2020, the file or the database having been stored in an external recording medium such as the hard disk drive 2040, the DVD-ROM drive 2060 (DVD-ROM 2095), the IC card, etc., and perform various types of processing on the data on the RAM 2020. The CPU 2000 may then write back the processed data to the external recording medium.

Various types of information, such as various types of programs, data, tables, and databases, may be stored in the recording medium to undergo information processing. The CPU 2000 may perform various types of processing on the data read from the RAM 2020, which includes various types of operations, processing of information, condition judging, conditional branch, unconditional branch, search/replace of information, etc., as described throughout this disclosure and designated by an instruction sequence of programs, and writes the result back to the RAM 2020. In addition, the CPU 2000 may search for information in a file, a database, etc., in the recording medium. For example, when a plurality of entries, each having an attribute value of a first attribute is associated with an attribute value of a second attribute, are stored in the recording medium, the CPU 2000 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A computer implemented method for managing mobile objects, the method comprising:
    determining, by a mobile object server, a position of a mobile object in a geographic space managed by the mobile object server;
    determining a plurality of expected routes based on the position of the mobile object in the geographic space, wherein an expected route of the plurality of expected routes is a path from the position of the mobile object in the geographic space to an estimated destination of a plurality of estimated destinations;
    calculating, by the mobile object server, a plurality of route parameters for the plurality of expected routes, wherein the plurality of route parameters includes a passage possibility of the mobile object over each route of the plurality of expected routes; and
    calculating a plurality of edge parameters for a plurality of edges, wherein each edge of the plurality of edges is a segment of a route from the plurality of expected routes, and wherein the edge parameter includes a passage possibility of the mobile object over each edge; and
    returning events related to the plurality of edges having a passage possibility above a threshold value, wherein plurality of edges having a passage possibility above a threshold value comprises edges contained in the plurality of expected routes and edges near the plurality of expected routes that are not contained in the plurality of expected routes.

2. The method according to claim 1, wherein calculating the plurality of edge parameters for the plurality of edges includes calculating the edge parameter for each edge included in the plurality of expected routes, based on the route parameter of each route containing the edge.

3. The method according to claim 2, wherein calculating the plurality of edge parameters for the plurality of edges comprises adding together the passage probability of each route containing the edge.

4. The method according to claim 1, further comprising:
    searching for events located in the plurality of edges within the geographic space; and
    providing notification about the events to the mobile object.

5. The method according to claim 4, wherein searching for events located in the plurality of edges comprises prioritizing events of edges that have a higher edge parameter.

6. The method according to claim 4, wherein searching for events located in the plurality of edges comprises setting a search range for events located at a plurality of edges included in the plurality of expected routes, and searching for events of each edge included in the search range.

7. The method according to claim 6, wherein searching for events located in the plurality of edges further comprises setting the search range of the plurality of edges to span from a current position of the mobile object to an edge that is farther away on the route, for routes that have a higher route parameter.

8. The method according to claim 7, wherein searching for events located in the plurality of edges further comprises based on determining there is an route with a route parameter that is higher than a reference parameter value among the plurality of expected routes, setting the search range at each edge to span from the current position of the mobile object to an estimated destination on the route.

9. The method according to claim 6, wherein searching for events located in the plurality of edges further comprises setting the search range within a greater distance range from the edge, for edges that have a higher edge parameter.

10. The method according to claim 6, wherein searching for events located in the plurality of edges further comprises setting the search range within a shorter distance range from the edge, for edges that are closer to an estimated destination on the plurality of expected routes, among each of the edges included in the plurality of expected routes.

11. The method according to claim 6, wherein searching for events located in the plurality of edges further comprises setting the search range within a greater distance range from the edge, for edges that are farther from a current position of the mobile object, among each of the edges included in the plurality of expected routes.

12. The method according to claim 5, wherein the notification is based on the prioritized events.

13. The method according to claim 4, wherein the notification includes setting a notification range of events at a plurality of edges included in the plurality of expected routes, and providing notification about the events of each edge included in the notification range.

14. The method according to claim 13, wherein the notification includes setting the notification range at each edge to span from a current position of the mobile object to an edge that is farther away on the route, for routes that have a higher route parameter.

15. The method according to claim 1, wherein determining a plurality of expected routes includes estimating a most probable path (MPP), which is a route that is most likely to be traveled by the mobile object in the future, as the route.

16. The method according to claim 1, wherein determining a plurality of expected routes includes sequentially updating the plurality of expected routes.

17. The method according to claim 16, wherein determining a plurality of expected routes includes updating the route sets every time the mobile object moves to a new edge.

18. A computer program product for managing mobile objects, the computer program product comprising:
    a non-transitory computer-readable storage device and program instructions stored on the non-transitory computer-readable storage device, the program instructions comprising:

determining, by a mobile object server, a position of a mobile object in a geographic space managed by the mobile object server;

determining a plurality of expected routes based on the position of the mobile object in the geographic space, wherein an expected route of the plurality of expected routes is a path from the position of the mobile object in the geographic space to an estimated destination of a plurality of estimated destinations;

calculating, by the mobile object server, a plurality of route parameters for the plurality of expected routes, wherein the plurality of route parameters includes a passage possibility of the mobile object over each expected route; and calculating a plurality of edge parameters for a plurality of edges, wherein each edge is a segment of a route, and wherein the edge parameter includes the passage possibility of the mobile object over each edge; and returning events related to the plurality of edges having a passage possibility above a threshold value, wherein plurality of edges having a passage possibility above a threshold value comprises edges contained in the plurality of expected routes and edges near the plurality of expected routes that are not contained in the plurality of expected routes.

19. A computer system for managing mobile objects, the computer system comprising:

a processor, a computer-readable tangible storage device, and program instructions stored on computer-readable tangible storage device for execution by the processor, the program instructions comprising:

determining, by a mobile object server, a position of a mobile object in a geographic space managed by the mobile object server;

determining a plurality of expected routes based on the position of the mobile object in the geographic space, wherein an expected route of the plurality of expected routes is a path from the position of the mobile object in the geographic space to an estimated destination of a plurality of estimated destinations;

calculating, by the mobile object server, a plurality of route parameters for the plurality of expected routes, wherein the plurality of route parameters includes a passage possibility of the mobile object over each expected route; and calculating a plurality of edge parameters for a plurality of edges, wherein each edge is a segment of a route, and wherein the edge parameter includes the passage possibility of the mobile object over each edge; and returning events related to the plurality of edges having a passage possibility above a threshold value, wherein plurality of edges having a passage possibility above a threshold value comprises edges contained in the plurality of expected routes and edges near the plurality of expected routes that are not contained in the plurality of expected routes.

* * * * *